United States Patent
Gregory et al.

(10) Patent No.: US 10,220,955 B2
(45) Date of Patent: Mar. 5, 2019

(54) NON-INVASIVE AND PREDICTIVE HEALTH MONITORING OF AN AIRCRAFT SYSTEM

(71) Applicant: Delta Air Lines, Inc., Atlanta, GA (US)

(72) Inventors: Michael Gregory, Fayetteville, GA (US); Eric Holstein, Sharpsburg, GA (US); Michael Linzbach, Peachtree City, GA (US); Richard Shideler, Sharpsburg, GA (US)

(73) Assignee: Delta Air Lines, Inc., Atlanta, GA (US)

( * ) Notice: Subject to any disclaimer, the term of this patent is extended or adjusted under 35 U.S.C. 154(b) by 53 days.

(21) Appl. No.: 15/398,812

(22) Filed: Jan. 5, 2017

(65) Prior Publication Data
US 2018/0186469 A1 Jul. 5, 2018

(51) Int. Cl.
*B64D 45/00* (2006.01)
*B64D 13/08* (2006.01)
(Continued)

(52) U.S. Cl.
CPC .............. *B64D 45/00* (2013.01); *B64D 13/08* (2013.01); *B64F 5/60* (2017.01); *G01K 7/16* (2013.01);
(Continued)

(58) Field of Classification Search
CPC ........ B64D 13/03; B64D 13/08; B64D 45/00; B64D 2013/0603; B64D 2013/064;
(Continued)

(56) References Cited

U.S. PATENT DOCUMENTS

| 2,607,808 | A | * | 8/1952 | Kehoe | .................... G01K 1/143 136/229 |
| 3,022,478 | A | * | 2/1962 | Fish | ........................ G01K 1/143 338/25 |

(Continued)

FOREIGN PATENT DOCUMENTS

| DE | 3126931 A1 | * | 2/1983 | ............. G01K 1/143 |
| EP | 88362 A1 | * | 9/1983 | |

(Continued)

OTHER PUBLICATIONS

Google Translation of JP 10-96654 (original JP document published Apr. 14, 1998) (Year: 1998).*

(Continued)

*Primary Examiner* — Behrang Badii
*Assistant Examiner* — David A Testardi
(74) *Attorney, Agent, or Firm* — King & Spalding

(57) ABSTRACT

A health monitoring system of an aircraft includes a plurality of sensors and interfaces that are non-invasively installed in a system of the aircraft. Further, the health monitoring system includes a data concentrator unit that is coupled to the plurality of sensor and interfaces. The data concentrator unit receives data associated with various components of the aircraft system from the plurality of sensor and interfaces. Responsively, the data concentrator unit processes the received data to generate a single output data stream that is transmitted to a configurable data receiver unit of the aircraft. The configurable data receiver unit transmits the received single output data stream to a ground server and an on-board display to monitor and determine a health and/or performance of the aircraft system.

27 Claims, 13 Drawing Sheets

(51) Int. Cl.
*B64F 5/60* (2017.01)
*G01K 7/16* (2006.01)
*G01L 19/00* (2006.01)
*G07C 5/00* (2006.01)
*B64D 13/06* (2006.01)

(52) U.S. Cl.
CPC .......... *G01L 19/0092* (2013.01); *G07C 5/008* (2013.01); *B64D 2013/0603* (2013.01); *B64D 2013/064* (2013.01)

(58) Field of Classification Search
CPC ... B64D 2045/0085; B64D 13/06; B64F 5/60; G01C 5/008; G01C 5/0816; G01L 19/0092; F24F 11/38
See application file for complete search history.

(56) References Cited

U.S. PATENT DOCUMENTS

| | | | | |
|---|---|---|---|---|
| 4,346,864 | A * | 8/1982 | Feller | G01K 1/143 236/1 R |
| 5,135,161 | A * | 8/1992 | Goodman | B64D 13/08 137/118.06 |
| 5,505,092 | A * | 4/1996 | Kowalski | G01L 9/0002 338/4 |
| 7,624,632 | B1 * | 12/2009 | Hoyle | G01M 3/2807 73/204.11 |
| 8,437,904 | B2 | 5/2013 | Mansouri et al. | |
| 9,724,979 | B1 * | 8/2017 | Thumati | B64D 13/06 |
| 2004/0176887 | A1 * | 9/2004 | Kent | G05B 23/0221 701/29.5 |
| 2005/0096873 | A1 * | 5/2005 | Klein | G01H 1/006 702/184 |
| 2005/0133211 | A1 * | 6/2005 | Osborn | F28F 19/00 165/157 |
| 2005/0235755 | A1 * | 10/2005 | Hindman | G01L 9/0002 73/756 |
| 2008/0312783 | A1 * | 12/2008 | Mansouri | G07C 5/0808 701/31.4 |
| 2009/0135882 | A1 * | 5/2009 | Kloiber | G01D 11/245 374/185 |
| 2010/0177802 | A1 * | 7/2010 | Weyna | F25D 29/005 374/208 |
| 2014/0161151 | A1 * | 6/2014 | Proctor | G01K 1/143 374/147 |
| 2014/0214365 | A1 * | 7/2014 | Ligeret | G01M 99/005 702/183 |
| 2015/0055679 | A1 * | 2/2015 | Li | G01K 13/02 374/143 |
| 2016/0320291 | A1 * | 11/2016 | Najjar | G01N 17/008 |
| 2016/0356677 | A1 * | 12/2016 | Bollas | G01M 99/005 |
| 2017/0060125 | A1 * | 3/2017 | Beaven | G05B 23/0235 |
| 2017/0261406 | A1 * | 9/2017 | Dion | G01M 99/008 |
| 2018/0031290 | A1 * | 2/2018 | Ho | B64D 13/08 |

FOREIGN PATENT DOCUMENTS

| | | | |
|---|---|---|---|
| JP | 10096654 | A * | 4/1998 |
| JP | 10153505 | A * | 6/1998 |
| JP | 2002195887 | A * | 7/2002 |

OTHER PUBLICATIONS

Najjar, Nayeff et al., "Optimal sensor selection and fusion for heat exchanger fouling diagnosis in aerospace systems", IEEE Sensors Journal, vol. 16, No. 12, Jun. 15, 2016, pp. 4866-4881. (Year: 2016).*

Parker Hannifin catalog, "Transair: Advanced Pipe Systems", Compressed air, Vacuum, Inert Gas, © 2015 Parker Hannifin Corporation, CAT.3515-TRN 2/15, 102 pages (Year: 2015).*

G450 Systems Air Conditioning System, Code 7700 LLC Normals Abnormals G450 Academics; http://code7700.com/g450_ecs.html, (Aug. 25, 2016).

Przytula, K. Wojtek et al., "Health Monitoring for Commercial Aircraft Systems," 26$^{th}$ International Congress of the Aeronautical Sciences, ICAS 2008, (2008).

Safa-Bakhsh, Robab et al., "Sensory Prognostics and Management System II," U.S. Department of Transportation, Jan. 2016.

* cited by examiner

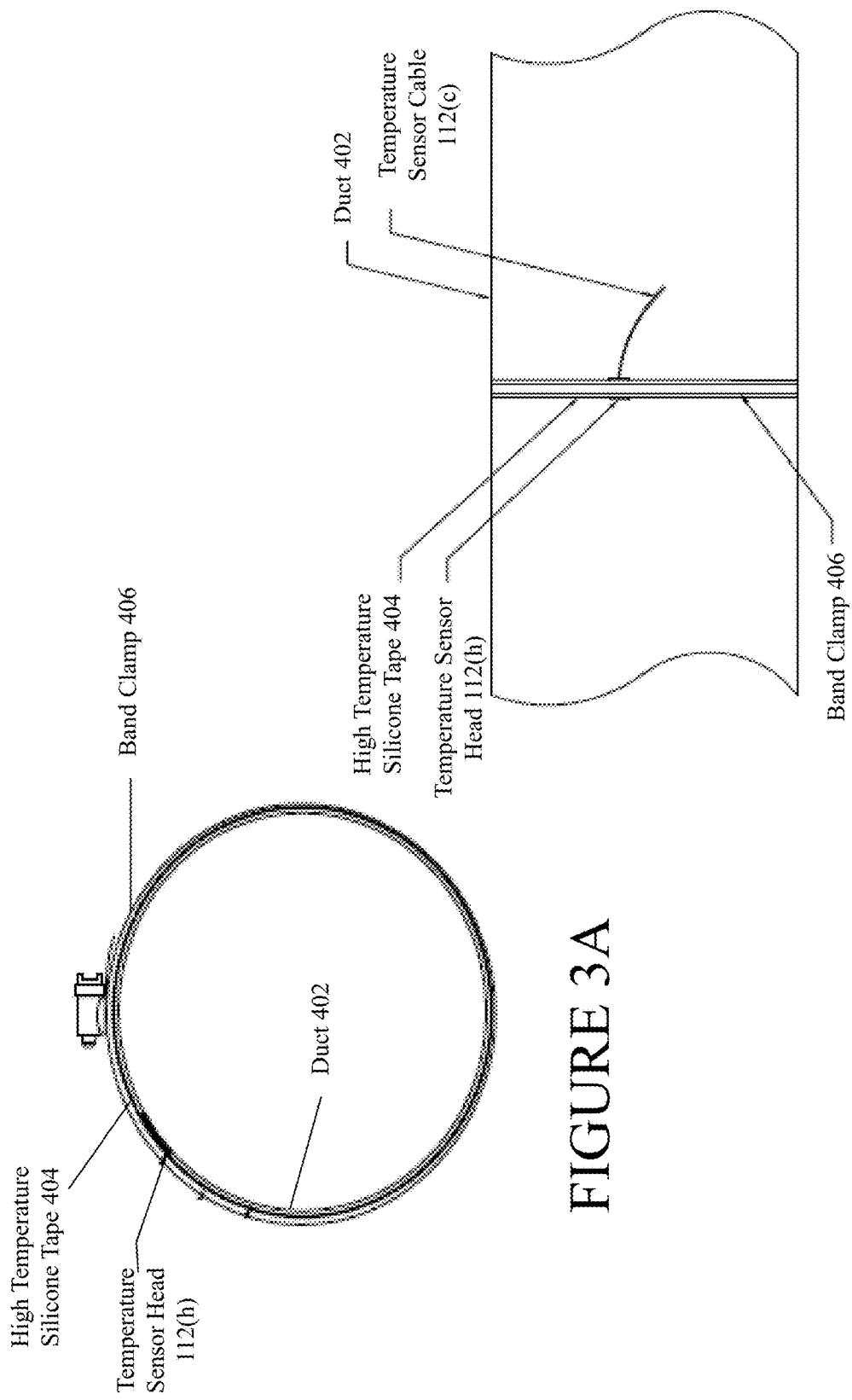

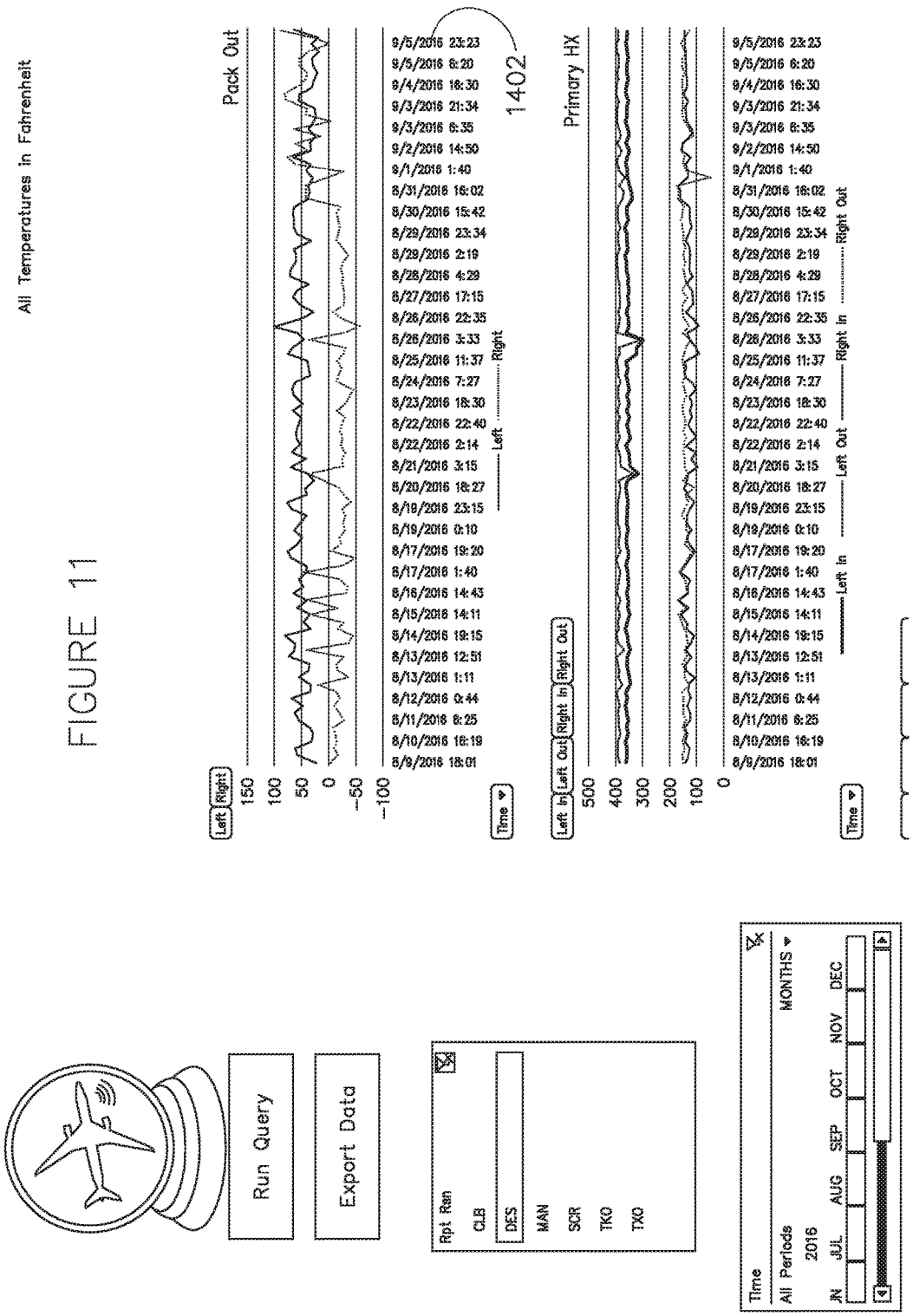

NON-INVASIVE AND PREDICTIVE HEALTH MONITORING OF AN AIRCRAFT SYSTEM

TECHNICAL FIELD

The present disclosure relates generally to health monitoring of complex systems, and in particular to a non-invasive and predictive health monitoring of an aircraft system.

BACKGROUND

An air-conditioning system of an aircraft is designed to provide a constant flow of fresh air into a pressurized body of the aircraft for ventilating one or more cabins of the aircraft and/or to maintain a relatively constant and comfortable temperature and humidity level of the ventilation air for the passengers and crew in the aircraft, both on the ground and in the air. Typically, the air-conditioning system includes at least two substantially symmetrical and independent air-conditioning units referred to as air-conditioning packs, e.g., left air-conditioning pack and right air-conditioning pack, that are disposed in an unpressurized area of the aircraft. The air-conditioning packs are configured to receive engine bleed air, process the engine bleed air, and generate conditioned air for air-conditioning and pressurization of the one or more cabins of the aircraft.

The air-conditioning packs are generally known to have low inherent reliability because they are a high vibration and high heat system which results in frequent performance degradation and/or failure of the air-conditioning pack components. Such performance degradation or failure of the air-conditioning packs may result in high operational and maintenance cost to the aircraft operator. For example, if one or both the air-conditioning packs fail during flight, the aircraft may be restricted to fly at a lower altitude than the aircraft's typical cruise altitude. Flying at a lower altitude results in significantly higher fuel burn, which in turn translates to high operations costs and monetary losses for the aircraft operator. Furthermore, the failure or even a degradation in performance of the air-conditioning packs that control the temperature inside the passenger cabins would result in passenger discomfort. Also, in some cases, the failure or degradation in performance of the air-conditioning packs may result in maintenance delays, cancellation of flights, and/or flight exceptions, resulting in huge monetary losses for the aircraft operator. Therefore, the a health of the air-conditioning packs of the aircraft is vital to an efficient operation of the aircraft as well as to ensure passenger comfort.

Conventional systems for monitoring the health of air-conditioning packs (air-conditioning health monitoring system) in aircraft, such as Boeing 737, McDonnell Douglas MD-88, etc., are limited to one or two sensors that monitor the temperature of the conditioned air at the output of the air-conditioning packs. The conventional systems may generate an alert when the temperature of the conditioned air is above or below a threshold temperature value or when at least one of the air-conditioning packs fail. However, said alerts do not identify the discrepant component of the air-conditioning packs that is causing of the performance degradation or failure of the air-conditioning packs. Further, it may be difficult for the maintenance crew to reproduce a performance degradation or failure of the air-conditioning packs that occurred while the aircraft was in flight since the exact variables of flight are not present while the aircraft is on the ground for maintenance. Therefore, the maintenance crew often has to conduct extensive troubleshooting to determine which component of the air-conditioning packs has failed or is functioning incorrectly, replace said component, and/or send the failed component for repair. An error in the troubleshooting may result in the wrong component being replaced and the maintenance crew may have to spend additional time finding the discrepant component, thereby increasing the maintenance time. Additionally, when the wrong component is replaced and sent to the repair shop, the component has to be tested and recertified before installing it back on the aircraft resulting in additional maintenance cost and time.

Additional sensors can be installed in the air-conditioning packs to provide detailed information regarding the performance of the different components of the air-conditioning packs, thereby improving the ability of the maintenance crew to rightly identify and troubleshoot a discrepancy in the air-conditioning packs in a first attempt. However, electrical and hardware limitations of aircraft, such as Boeing 737, McDonnell Douglas MD-88, etc., restrict the number of additional sensors that can be installed in the aircraft for monitoring the health of the air-conditioning system. For example, a flight data acquisition unit of the aircraft that is a central collection point for the sensor inputs has less than ten sensor input ports available for system monitoring purposes, thereby limiting the number of additional sensors that can be installed for air-conditioning health monitoring. In other words, the configurable data receiver unit may have limited bandwidth for additional sensors. Further, the conventional air-conditioning health monitoring systems follow a reactive approach where alerts are generated after the components of the air-conditioning packs have failed.

Newer aircraft, such as Boeing 777, Boeing 787, etc., do have a more predictive air-conditioning health monitoring system. However, said systems on the newer aircraft are invasive, that is, they require significant structural modifications to the aircraft ducting and/or equipment, such as drilling holes. Such modifications would increase the chances of fatigue failures, cracking, etc., which translates to additional operational and/or maintenance costs to the aircraft operator. Further, the features of the predictive air-conditioning health monitoring system in the newer aircraft are not available in the base model of the aircraft. Instead, they are provided as add-on features in higher models or as accessories that can be purchased at a higher premium.

In view of the above mentioned shortcomings of existing air-conditioning health monitoring systems, there exists a need for an improved air-conditioning health monitoring system that is also cost-efficient.

SUMMARY

The present disclosure addresses the shortcomings of conventional health monitoring systems in an aircraft by providing a relatively inexpensive system for non-invasive and predictive health monitoring of an aircraft system. In particular, the health monitoring system of the present disclosure is configured to non-invasively monitor parameters associated with one or more components of an aircraft system to: (a) determine the health of the components of the aircraft system (b) predict a degradation of the components of the aircraft system to allow the maintenance crew to react before an actual failure of the aircraft system, and (c) provide a diagnostic tool to assist with troubleshooting the aircraft system in case of a performance degradation or failure. Further, the health monitoring system of the present disclosure is configured to retrofit aircraft systems of any appropriate aircraft.

One example environment where the non-invasive and predictive health monitoring system of the present disclosure may be used is an air-conditioning system of an aircraft for monitoring the health and/or performance of the air-conditioning system of the aircraft. The air-conditioning health monitoring system of the present disclosure includes a plurality of temperature sensors that are disposed at different locations in the left and right air-conditioning packs of an aircraft to measure the temperature of the air passing through air-conditioning packs at different points in the air-conditioning packs. In particular, the temperature sensors are non-invasively installed on external surfaces of ducts in the air conditioning packs. For example, each temperature sensor is surface-mounted to a respective duct using one or more fasteners, such as band clamps, thereby eliminating the need to invasively cut into the ducts for installation. Further, the air-conditioning health monitoring system includes an air pressure sensor that is non-invasively coupled to a trim air duct of one of the air-conditioning packs using a tee fitting to measure the air pressure of the trim air passing through the trim air duct. Furthermore, the air-conditioning health monitoring system includes an interface with the switches of one or more valves of the air-conditioning packs of the aircraft to obtain the position of the one or more valves.

Additionally, the air-conditioning health monitoring system includes a data concentrator unit that is non-invasively mounted in an appropriate location of the aircraft using appropriate non-invasive mounting mechanism. For example, the data concentrator unit may be non-invasively mounted to stringers of the aircraft inside the pressurized compartment of the aircraft using stringer clips and a mounting plate. The data concentrator unit is coupled to the output of the plurality of temperature sensors, the pressure sensor, and the one or more valves. The data concentrator unit receives sensor data and valve position data from the respective sensors and valve switches, converts the received data to a single output data stream that is in a format recognizable by and compatible with an appropriate data receiver unit of the aircraft, such as a configurable ARINC 429 data receiver, and transmits the single output data stream to an input port of the data receiver unit. Accordingly, the output of the data concentrator unit is coupled to an input port of the data receiver unit. Responsive to receiving the single output data stream, the data receiver unit transmits, either periodically or based on a trigger, the single output data stream to an onboard display unit for quick, real-time viewing of the air conditioning system's performance; and to a ground server via a datalink system of the aircraft, such as the aircraft communications addressing and reporting system (ACARS) of the aircraft. The ground server may process and analyze the received sensor data and the valve position data to generate trends and/or other data associated with the performance of the air-conditioning pack systems.

The process of non-invasively and predictively monitoring the performance of air-conditioning pack components as set forth in the present disclosure preserves the structural integrity of the aircraft which reduces installation costs and certification efforts. Further, the process of non-invasively and predictively monitoring the performance of air-conditioning pack components allows the maintenance crew to: (a) predict a degradation of the air-conditioning packs before an actual failure of the air conditioning packs occur, and (b) identify and fix the discrepant component causing the degradation of the air conditioning packs in a first attempt, thereby saving a significant amount of maintenance time and cost.

These and other aspects, features, and embodiments of the disclosure will become apparent to a person of ordinary skill in the art upon consideration of the following brief description of the figures and detailed description of illustrated embodiments.

BRIEF DESCRIPTION OF THE DRAWINGS

The foregoing and other features and aspects of the disclosure are best understood with reference to the following description of certain example embodiments, when read in conjunction with the accompanying drawings, wherein:

FIGS. 3A and 3B (collectively 'FIG. 3') illustrate a cross-sectional view and a side view of a duct of an aircraft pack system with a temperature sensor installed non-invasively thereon, respectively, in accordance with example embodiments of the present disclosure;

FIG. 11 illustrates an example aircraft air-conditioning pack health diagnostic tool, in accordance with example embodiments of the present disclosure.

Figure 1:
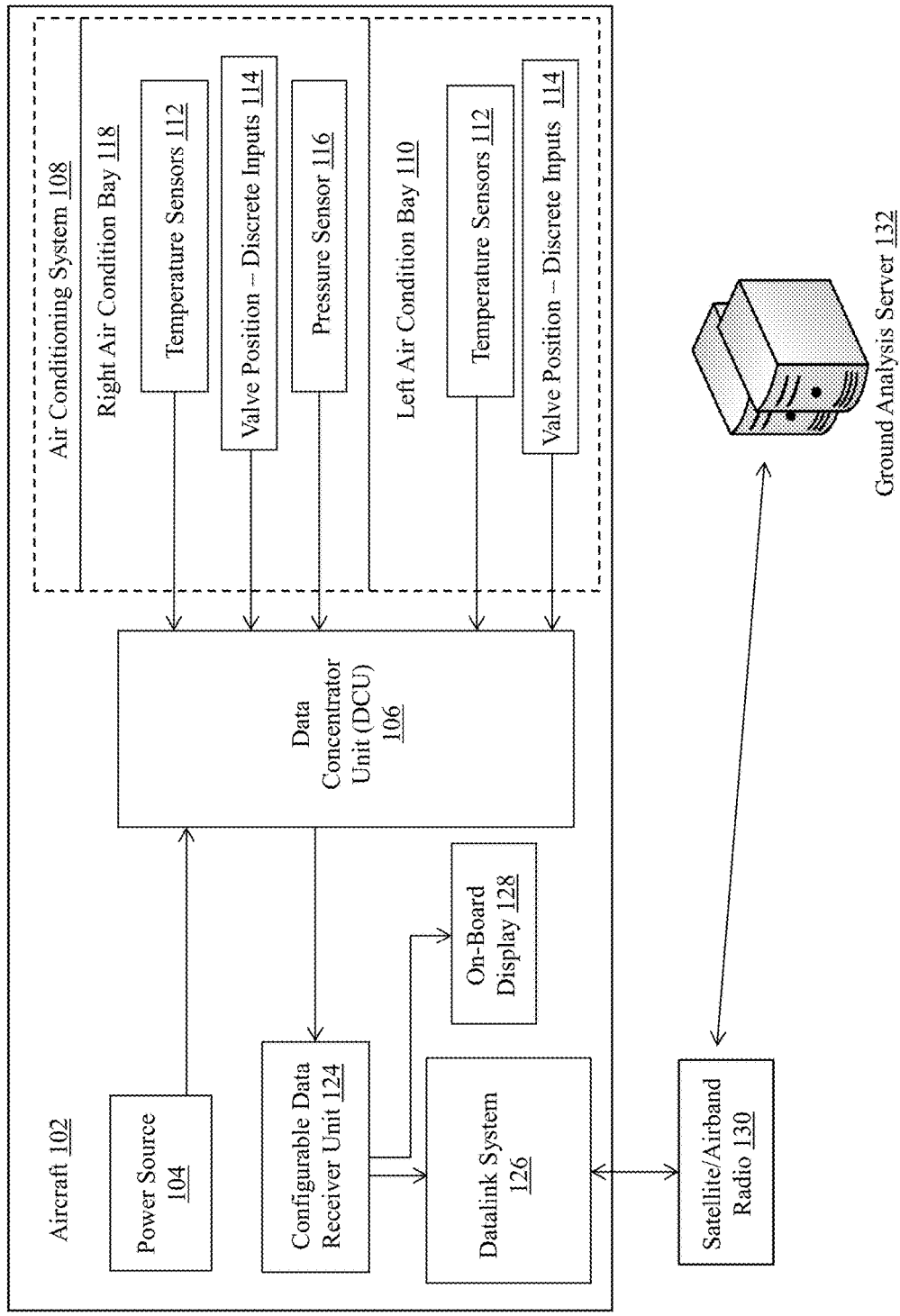
FIG. 1 illustrates an example operating environment of a non-invasive and predictive aircraft pack monitoring system, in accordance with example embodiments of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles.

DETAILED DESCRIPTION OF EXAMPLE EMBODIMENTS

In the following paragraphs, a system, method, and apparatus for non-invasive and predictive monitoring of the performance of an aircraft system will be described in further detail by way of examples with reference to the attached drawings. In the description, well known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

In one example, the system, method, and apparatus of the present disclosure is directed towards monitoring the health (and/or performance) of the air-conditioning system of an aircraft by non-invasively equipping the air-conditioning packs of the aircraft with instruments such as sensors and discrete input interfaces to improve an operational reliability of the air-conditioning system through predictive analysis of a performance of the air-conditioning packs' components. The instruments that are non-invasively installed in the air-conditioning packs are coupled to a data concentrator unit that is also non-invasively installed in the aircraft. The data concentrator unit collects temperature, pressure, and valve position data associated with the air-conditioning packs from the instruments and converts the received data to a single output data stream. Further, the single output data stream is transmitted to a ground server and/or an on-board display unit via a configurable data receiver unit and/or a datalink system of the aircraft for further processing and analysis. The configurable data receiver unit may include a configurable ARINC 429 receiver, such as a digital flight data acquisition unit (DFDAU), a Quick Access Recorder (QAR), etc., that may be configurable to transmit the data received from the data concentrator unit to a ground server via a datalink system of the aircraft and/or to an on-board display of the aircraft.

It is noted that the air-conditioning health monitoring system of the present disclosure is a passive system that monitors parameters of different air-conditioning pack components and reports it to a ground server for further analysis and processing, but does not directly affect or interrupt the operation or performance of the aircraft. However, in other example embodiments, the output of the air conditioning health monitoring system (herein 'AC monitoring system') may be used to control operations or functions of the one or more systems of the aircraft without departing from a broader scope of the present disclosure.

The system, method, and apparatus of the present disclosure will be further described in greater detail below. However, before discussing the example embodiment directed to the system, method, and apparatus of the present disclosure, it may assist the reader to understand the various terms used herein by way of a general description of the terms in the following paragraphs.

The term 'non-invasive,' as used herein may generally refer to an appropriate process of installing an instrument on a surface without cutting/breaking into or creating new openings in the surface. As such, the term "non-invasive" encompasses installation process that makes use of pre-existing opening in the surface, such as, by way of non-limiting example, an existing opening in the trim air duct of the air-conditioning pack to route trim air to a trim air pressure valve.

The term 'pack' as used herein may refer to a system of the aircraft that is configured to receive and convert engine bleed air to conditioned air for pressurization and air-conditioning of one or more pressurized cabins of the aircraft.

Technology associated with the system, apparatus, and method for non-invasive and predictive monitoring of an air-conditioning system of an aircraft will now be described in greater detail with reference to FIGS. 1-11. In particular, first, FIG. 1 will be discussed in the context of describing a representative operating environment associated with the system, method, and apparatus for non-invasive and predictive air conditioning health monitoring, according to certain exemplary embodiments of the present invention. Further, FIGS. 2-11 will be discussed, making exemplary reference back to FIG. 1 as may be appropriate or helpful.

It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Turning to FIG. 1, this figure illustrates an example operating environment of a non-invasive and predictive aircraft pack monitoring system, in accordance with example embodiments of the present disclosure. The AC monitoring system of the aircraft 102 illustrated in FIG. 1 may include a plurality of temperature sensors 112 that are non-invasively installed at different locations in both the left air-conditioning pack 110 (herein 'left pack') and right air-conditioning pack 118 (herein 'right pack') of the air-conditioning system 108 of the aircraft 102. The plurality of temperature sensors 112 may be configured to monitor a temperature of the air that is routed through the left and right packs (110, 118) at different locations of the left and right packs (110, 118). Monitoring the temperature of the air passing through the packs (110, 118) at different locations of the packs (110, 118) allows an accurate identification of discrepancy in individual components of the left or right pack (110 or 118) that is operating inaccurately. For example, an inconsistent temperature reading of the air at an output of an AC pack component_X identifies the AC pack component_X as the discrepant part that causes a performance degradation or failure of the AC pack.

In addition to the temperature sensors, the AC monitoring system may include interfaces 114 to the switches of one or more valves in both the left pack 110 and the right pack 118. The interfaces 114 may be non-invasively and electrically coupled to the switches of the one or more valves by tapping into existing aircraft wiring and may be configured to collect data representative of a position of the one or more valves, e.g., open, partially open, closed, etc. In other words, the valves are not modified to collect the valve position data. Further, the AC monitoring system may include a pressure sensor 116 that is non-invasively installed in the right pack 118 to monitor a trim air pressure in the trim air duct (shown in FIG. 4A) of the air-conditioning system. Even though the present disclosure describes that the pressure sensor 116 is installed in the right pack 118, one of ordinary skill in the art can understand and appreciate that in other example embodiments, the pressure sensor 116 may be installed in any other areas of the aircraft without departing from a broader scope of the present disclosure.

Furthermore, as illustrated in FIG. 1, the AC monitoring system may include a data concentrator unit 106 that is disposed in the fuselage of the aircraft 102, preferably in the forward cargo compartment or the air conditioning distribution bay, such that it is protected from the external environment and does not pose the threat of being a projectile in the event of breaking off from the aircraft. In particular, the data concentrator unit may be securely coupled to the airframe, e.g., stringers of the aircraft 102, using stringer clips and/or other fasteners. However, one of ordinary skill in the art can understand and appreciate that in other example embodiments, the data concentrator unit 106 may be disposed in any other portion of the aircraft and may be securely coupled to any other part of the airframe using any other appropriate coupling mechanism without departing from a broader scope of the present disclosure.

The data concentrator unit 106 may be configured to receive an output from the temperature sensors 112, the pressure sensor 116, and the valve switch interfaces 114. Accordingly, wires carrying the sensor data and valve position data from the sensors and valve switch interfaces, respectively, are routed from the output of the sensors and valve switch interfaces installed in the left and right packs (110, 118) to the data concentrator unit 106. The wires may be routed through pre-existing wiring apertures disposed in pressure bulkheads of the aircraft 102 and may follow existing wiring bundles. Further, all new wiring associated with the AC monitoring system may be separated from the existing wiring bundles using wire clamps or wire spacers. Furthermore, in addition to the input from the sensors and the valve switch interfaces, the data concentrator unit 106 may be configured to receive electrical input power from a non-essential power source 104 of the aircraft 102, such as from an electrical bus that supplies power to the passenger cabin crew call system, for supporting the operation of the data concentrator unit 106 and/or the temperature and pressure sensors (112, 116).

Responsive to receiving the sensor data and the valve position data from the sensors (112, 116) and the valve switch interfaces 114, respectively, the data concentrator unit 106 may be configured to process the received data; convert the received data to a single output data stream, such as ARINC 429 words; and transmit the output data stream to a configurable data receiver unit, such as a configurable ARINC 429 receiver of the aircraft 102. Processing the received data may include, but is not limited to, determining air temperature, trim air pressure, and valve positions from the received data and converting some of the received data which is in analog form, e.g., voltages, to digital form. For example, in the case of the temperature and pressure sensors (112, 116), the data concentrator unit 106 may be configured to measure a voltage drop across an input and output of the temperature and pressure sensors (112, 116) to determine a temperature and pressure measured by the temperature and pressure sensors (112, 116), respectively. Further, the temperature and pressure values may be converted to a digital form and combined with the digital valve position data to generate the single output data stream, e.g., ARINC 429 words.

In addition to the data concentrator unit 106, the AC monitoring system may include a configurable data receiver unit 124 that is coupled to the output of the data concentrator unit 106. The configurable data receiver unit 124 may be configured to receive the output data stream from the data concentrator unit 106 and transmit it to a datalink system or other functionally equivalent devices of the aircraft 102, such as ACARS 126. Responsive to receiving the output data stream, the datalink system of the aircraft 102 may be configured to transmit the output data stream to a ground server 132 via satellites or an airband radio 130. Upon receiving the output data stream from the datalink system, the ground server 132 may be configured to further process and analyze the output data stream to generate and report performance trends of the AC packs (110, 118) which may then be used by the aircraft operator or maintenance crew for monitoring and diagnostic purposes. In addition to transmitting the output data stream to the datalink system 126, the configurable data receiver unit 124 may be configured to transmit the output data stream to an on-board display 128, such as the central display unit for quick and real-time viewing of the performance of the AC packs (110, 118).

In the example embodiment illustrated in FIG. 1, the AC monitoring system may include a total of seventeen sensors (112, 116) and six valve switch interfaces 114 installed in both the AC packs (110, 118). In particular, the AC monitoring system may include eight temperature sensors per pack (110, 118), totaling sixteen temperature sensors; one pressure sensor in the right pack bay; and three valve switch interfaces per pack (110, 118), totaling six valve switch interfaces. Even though the present disclosure describes the AC monitoring system as having seventeen sensors and six valve switch interfaces, one of ordinary skill in the art can understand and appreciate that in other example embodiments, the AC monitoring system may have more or lesser number of sensors and/or valve switch interfaces without departing from a broader scope of the present disclosure. For example, in some embodiments, the position of the flow control valve may already be available for AC health monitoring purposes via existing systems of the aircraft and accordingly, the AC monitoring system may not include a flow control valve interface. In said embodiments, the AC monitoring system may have a total of seventeen sensors and only four valve switch interfaces.

Further, one of ordinary skill in the art can understand and appreciate that even though the present disclosure describes using the temperature and pressure sensors to monitor the performance of the AC packs (110, 118), in other example embodiments, any other type of sensors may be used instead of or in addition to the temperature and pressure sensors to monitor any other feature of the air-conditioning system or other appropriate systems of the aircraft 102 without departing from a broader scope of the present disclosure. For example, vibration sensors may be used to monitor integrated drive generators (IDG) of the aircraft, optical sensor may be used to monitor leaks from ducts in the aircraft, electrical current sensors may be used for monitoring components that draw more or less current in the aircraft, etc. In another example, other types of sensors such as acoustic sensors, mechanical sensors, etc., may be used in combination with the data concentrator unit 106 and/or the configurable data receiver unit 124 of the aircraft, such as a configurable ARINC 429 receiver, for non-invasively and predictively monitoring any appropriate system of the aircraft as described in the present disclosure without departing from a broader scope of the present disclosure. Even though the present disclosure describes the configurable data receiver unit as being an ARINC 429 receiver that is configured to receive ARINC 429 words, one of ordinary skill in the art can understand and appreciate that in other example embodiments, other types of configurable data receiver units that are configured to receive other data types generated by the data concentrator unit may be used without departing from a broader scope of the present disclosure. For example, in some embodiments, the data concentrator unit may generate an output data stream that is not in the ARINC 429 format. In said example, another configurable data receiver unit that is compatible with the output data stream format may be used to receive and transmit said output data stream from the data concentrator unit without departing from a broader scope of the present disclosure.

The operation of the left and right packs (110, 118) and the location of the sensors (112, 116) and the valve interfaces 114 within the packs (110 and/or 118) will be described below in greater detail in association with FIG. 2A and FIG. 2B.

Figure 2A:
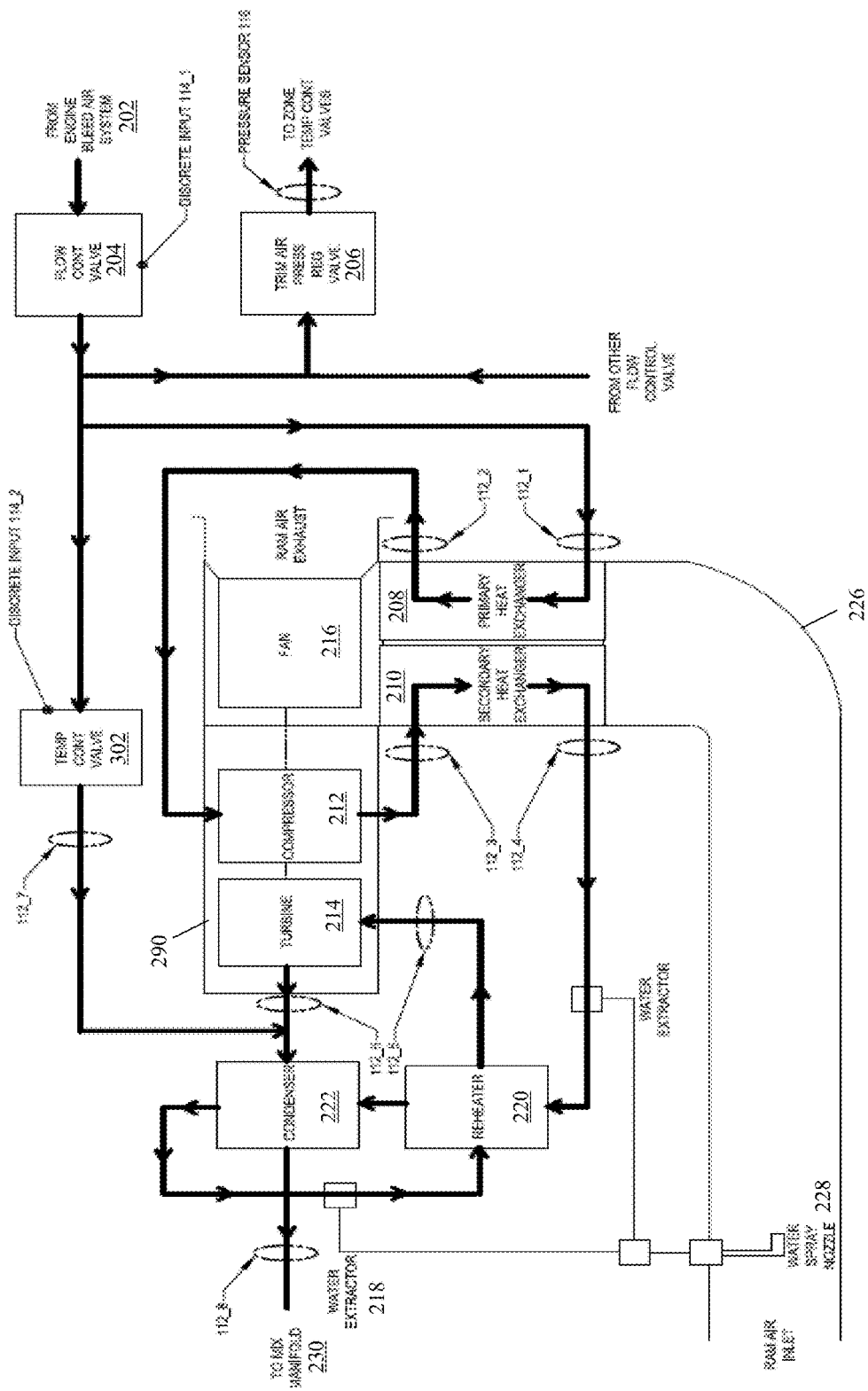
FIG. 2A illustrates a block diagram of the right pack system of an example aircraft along with example location of the sensors and discrete inputs, in accordance with example embodiments of the present disclosure.

Turning to FIG. 2A, this figure illustrates a block diagram of the right pack of an example aircraft's air-conditioning system along with example location of the sensors and valve interfaces in the right pack, in accordance with example embodiments of the present disclosure. The right pack 118 includes a flow control valve 204, a temperature control valve 302, a trim air pressure regulating valve 206, a primary heat exchanger 208, a secondary heat exchanger 210, an air cycle machine 290 that comprises a turbine 214, a compressor 212, and a fan 216, a re-heater 220, a condenser 222, water extractors 218, a water spray nozzle 228, and ram air flow chamber 226.

In general the operation of the air-conditioning system of the aircraft 102 includes extracting compressed air called bleed air 202 from propulsion engine compressors or electrical compressors and supplying it to both the packs (110, 118), where it is further compressed, cooled, and then expanded in a rotating air-cycle machine 290 to produce conditioned air that is supplied to the aircraft cabin. The conditioned air from the packs (110, 118) is supplied to a mixing manifold 230 that distributes it to zones in the cabin. Recirculation fans extract air from the cabin, pass it through filters, and supply it to the mixing manifold 230, where it mixes with the conditioned air from the packs (110, 118). Trim air which is the hot bleed air 202 that bypasses the packs (110, 118) is mixed in small amounts with the air supplied to the cabin from the mixing manifold 230 to provide independent fine temperature control in each zone of the aircraft 102. The trim air is carried by a trim air duct and the pressure of the trim air is regulated using the trim air pressure regulator valve 206 that is coupled to the trim air duct.

In particular, referring to FIG. 2A, the hot bleed air 202 that enters the right pack 118 passes through the flow control valve 204 which is configured to regulate or shutoff airflow into the pack. The hot bleed air 202 that passes through the flow control valve 204 initially enters the primary heat exchanger 208 where it is cooled by ram air (ambient outside air). The air discharged from the primary heat exchanger 208 then enters the compressor 212 of the air cycle machine (ACM) 290 where pressure and temperature of the air are increased. Then, the compressor discharge air is cooled by the ram air in the secondary heat exchanger 210. Subsequently, the air discharged from the secondary heat exchanger 210 enters the re-heater 220. In particular, the air discharged from the secondary heat exchanger 210 passes through the hot side of the re-heater 220 and is cooled by transferring heat to the colder air passing through the cold side of the re-heater 220. After leaving the re-heater 220, the air passes through the condenser 222 where further temperature reduction takes place, which lowers the temperature of the air to the level required for moisture condensation. The air is cooled in the condenser by cold turbine exhaust air from the turbine 214.

Condensed water droplets are removed by an inertial process in the water extractor 218. Water removed by high pressure through the water extractor 218 is routed to the water spray injector 228 in the ram air flow chamber 226 for the primary and secondary heat exchangers (208, 210). The spray cools the ram air and increases the systems cooling capacity.

The dry air leaving the water extractor 218 is heated again on the second pass through the re-heater 220, recovering the energy that normally would be added to the turbine exhaust in the cold side of the condenser 222. After passing through the re-heater 220, the dry air enters the turbine 214 of the air cycle machine 290 which expands the compressed air. In expanding through the turbine 214, the air delivers power to drive the compressor 212 and fan 216. The fan 216 of the air cycle machine 290 is used to bring cooling air into the ram air duct 226 when the aircraft 102 is on the ground. The energy lost from the turbine 214 airflow causes a temperature reduction resulting in turbine discharge air that is well below the ram air temperature during ground or low altitude operations. The cold discharge air passes through the condenser 222 on its way to the mix manifold 230. The cold air may cause condensation to form on the inlet of the condenser 222. This is regulated by the introduction of warm air from a standby temperature control valve (not shown). Further, the temperature of the pack discharge air that is output from the condenser 222 to the mix manifold 230 is controlled using the hot bleed air that passes through the temperature control valve 206.

As illustrated in FIG. 2A, the AC monitoring system may include two temperature sensors (112_1 and 112_2) that are installed on ducts at the input of the primary heat exchanger 208 and at the exit of the primary heat exchanger 208, respectively, to monitor the temperature of the air that enters and exits the primary heat exchanger 208 and to determine any discrepancy in the primary heat exchanger 208. Further, the AC monitoring system may include two temperature sensors (112_3 and 112_4) that are be installed on ducts at the input of the secondary heat exchanger 210 and at the exit of the secondary heat exchanger 210, respectively, to monitor the temperature of the air that enters and exits the secondary heat exchanger 210 and to determine any discrepancy in the secondary heat exchanger 210. The temperature sensor 112_2 installed on the duct that carries the air discharged from the primary heat exchanger 208 to the compressor 212 and the temperature sensor 112_3 that is installed on the duct that carries the air discharged from the compressor 212 to the secondary heat exchanger 210 can be used to determine discrepancy in the compressor 212.

Similar to the temperature sensors installed at the input and output of the primary and second heat exchangers (208, 210), the AC monitoring system may include two more temperature sensors (112_5 and 112_6) that are installed on ducts at the input of the turbine 214 and at the exit of the turbine 214, respectively, to monitor the temperature of the air that enters and exits the turbine 214 of the air cycle machine 290 and to determine any discrepancy in the turbine 214. The temperature sensor 112_4 installed on the duct that carries the air discharged from the secondary heat exchanger 208 to the re-heater 220 and the temperature sensor 112_5 that is installed on the duct that carries the air discharged from the re-heater 220 to the turbine 214 can be used to determine discrepancy in the re-heater 220. Additionally, the AC monitoring system may include two more temperature sensors (112_7 and 112_8), one installed on a duct at the output of the temperature control valve 302 and the other installed on a duct at the output of the condenser 222 carrying pack discharge air to the mix manifold 230. The temperature sensor 112_7 may be configured to monitor the temperature of the hot air that is used to control the temperature of the pack discharge air, and the temperature sensor 112_8 may be configured to monitor the temperature of pack discharge air.

As illustrated in FIG. 2A and as described above in association with FIG. 1, in addition to the temperature sensors 112_1 to 112_8, the AC monitoring system may include a first valve switch interface 114_1 to monitor the position of the flow control valve 204, a second valve switch interface 114_2 to monitor the position of the temperature control valve 302, and a pressure sensor 116 that is coupled to the trim air duct 550 (shown in FIG. 4A) to monitor a pressure of the trim air that is mixed with the pack discharge air to provide finer air temperature control in the different zones in the pressurized passenger cabin of the aircraft 102, e.g., forward passenger zone and/or aft passenger zone.

Figure 2B:
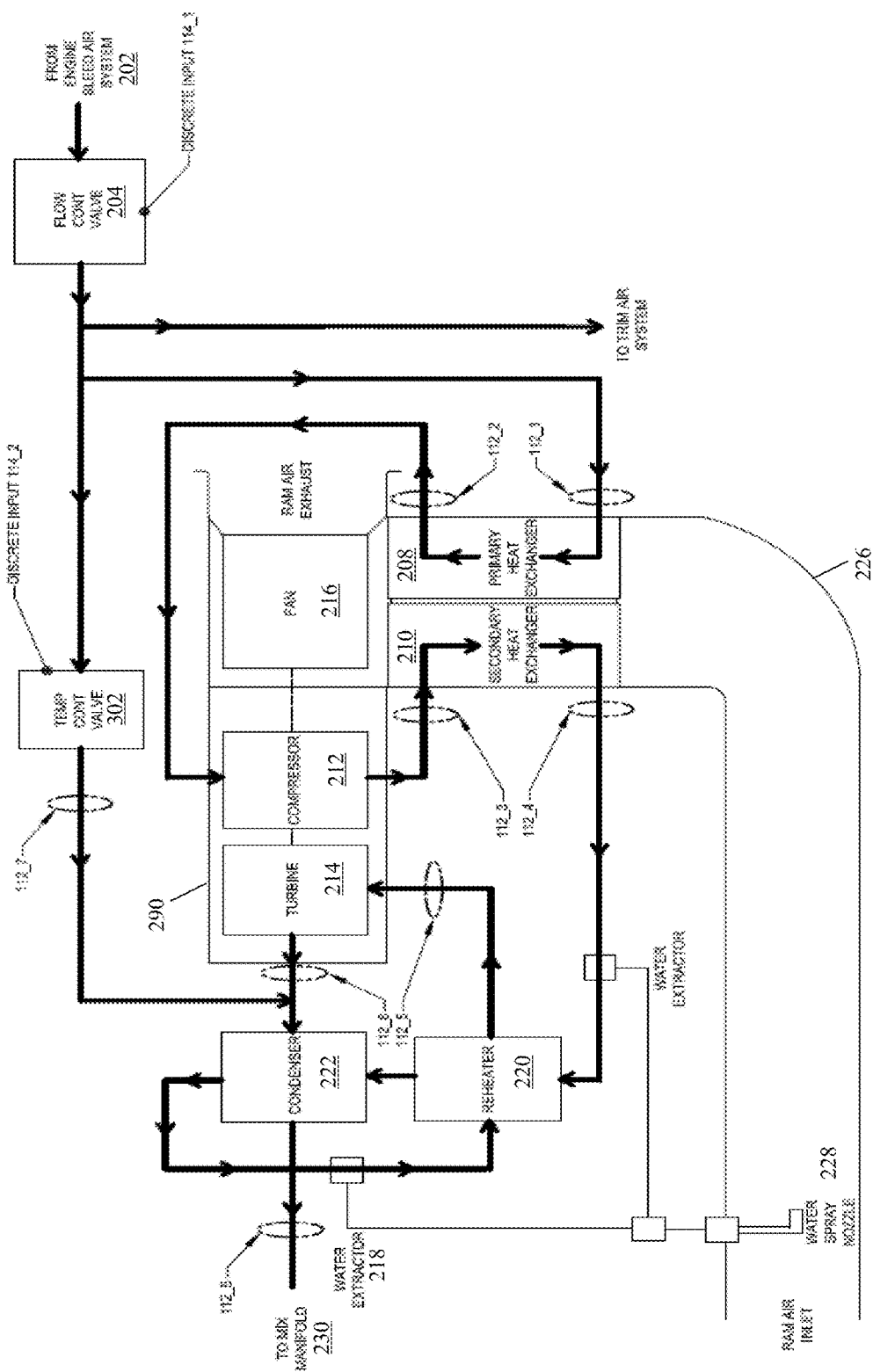
FIG. 2B illustrates a block diagram of the left pack system of the example aircraft along with example locations of the sensors and discrete inputs, in accordance with example embodiments of the present disclosure.

Even though FIG. 2A illustrates the AC monitoring system installed in the right pack, one of ordinary skill in the art can understand and appreciate that a similar AC monitoring system may also be installed in the left pack 110 as illustrated in FIG. 2B. Turning to FIG. 2B, this figure illustrates a block diagram of the left pack of the example aircraft's air-conditioning system along with example location of the sensors and valve interfaces in the left pack, in accordance with example embodiments of the present disclosure. It is noted that the left pack 110 is substantially similar to the right pack 118 in terms of the components and its operation. Further, the location of the temperature sensors 112_1 to 112_8 and the valve switch interfaces 114_1 and 114_2 of the AC monitoring system in the left pack 110 may be substantially similar to that in the right pack 118, except that the left pack bay does not include a pressure sensor 116. Accordingly, the operation of the left pack 110; the AC monitoring system; and the location of the temperature sensors 112 and the valve switch interfaces 114 of the AC monitoring system in left pack 110 will be not be repeated herein for the sake of brevity. It is also noted that the installation of all the sensors and the valve switch interfaces in both the left and the right packs (110, 118) are non-invasive. The non-invasive installation of the AC monitoring system and its operation will be described in greater detail below in association with FIGS. 6-9.

Turning now to FIGS. 6-9, these figures include flow charts that illustrate the process for installation of the AC monitoring system and its operation to predictively monitor the health of the aircraft's air-conditioning system. Although specific operations are disclosed in the flowcharts illustrated in FIGS. 6-9, such operations are exemplary. That is, embodiments of the present invention are well suited to performing various other operations or variations of the operations recited in the flowcharts. It is appreciated that the operations in the flowcharts illustrated in FIGS. 6-9 may be performed in an order different than presented, and that not all of the operations in the flowcharts may be performed. Further, it is noted that one or more of FIGS. 6-9 will be described by making reference to FIGS. 3-5 and FIGS. 10-11, as may be appropriate or helpful.

Figure 6:
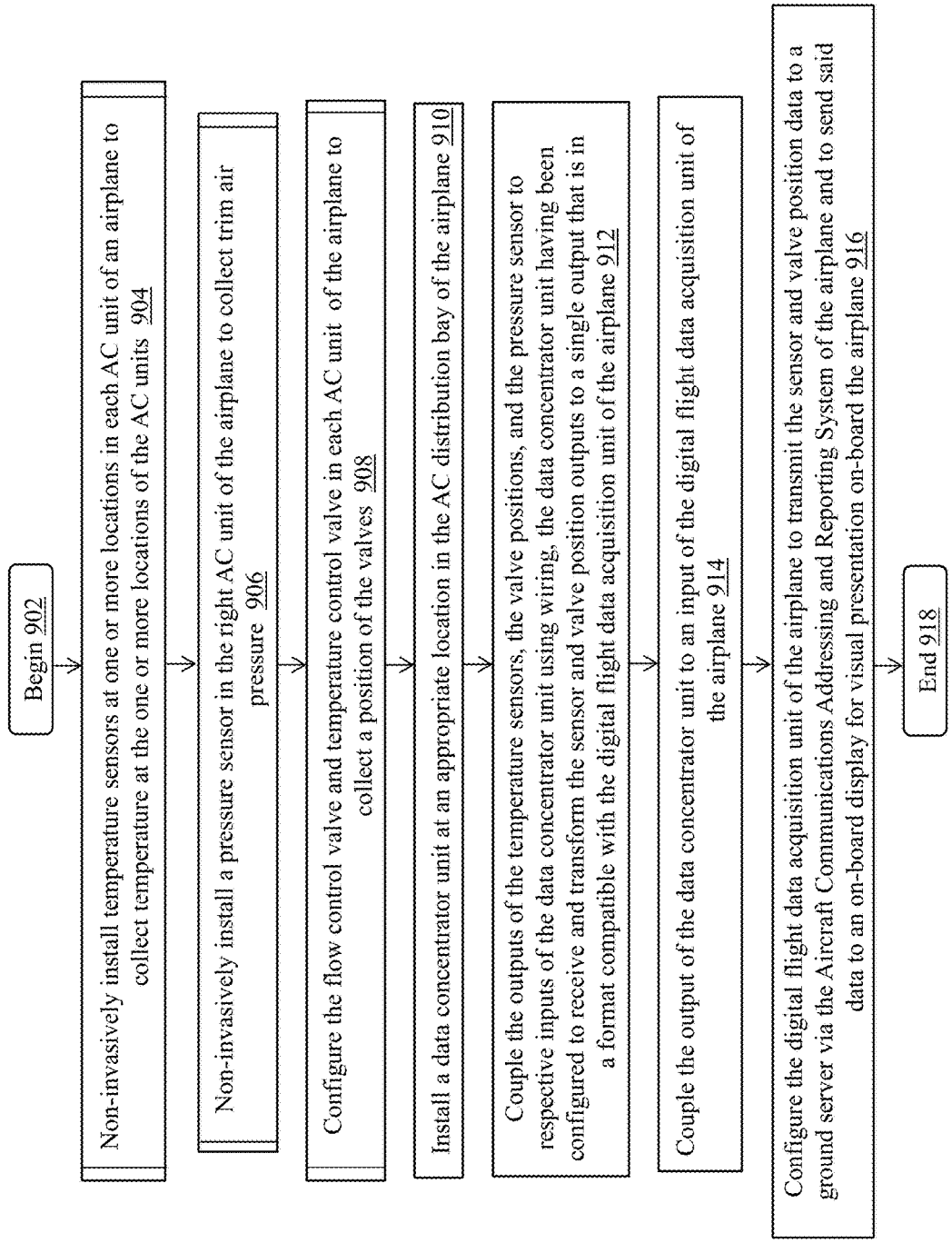
FIG. 6 illustrates an example method of the non-invasive aircraft pack monitoring system, in accordance with example embodiments of the present disclosure.

Turning to FIG. 6, this figure illustrates an example method of the non-invasive aircraft pack monitoring system, in accordance with example embodiments of the present disclosure. In operation 904, the temperature sensors 112 may be non-invasively installed on ducts in each of the left and right packs (110, 118) at the locations illustrated in FIGS. 2A and 2B. Operation 904 will be described below in greater detail in association FIG. 7 by making example reference to FIGS. 3A and 3B.

Figure 7:
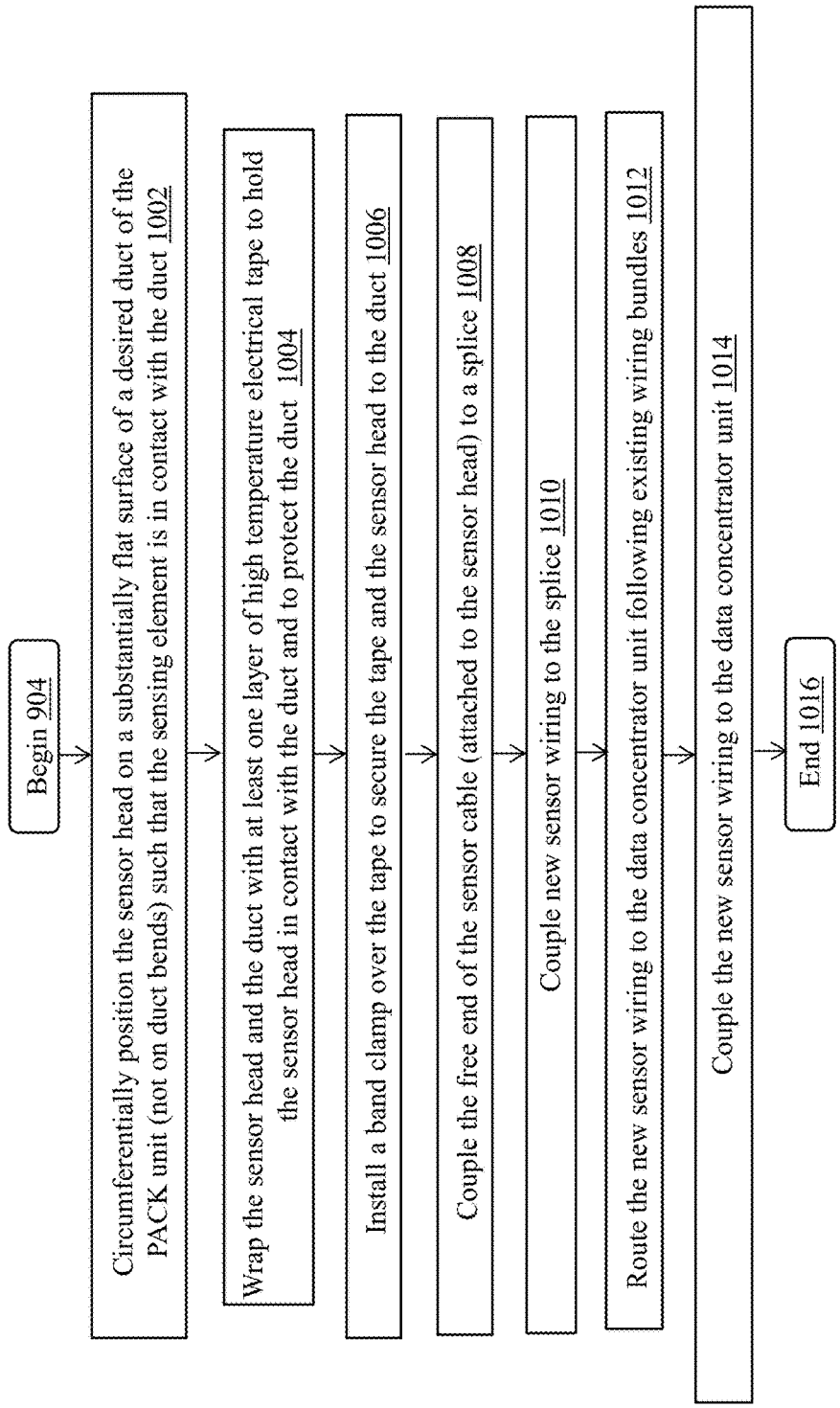
FIG. 7 illustrates an example method of non-invasively installing the temperature sensors, in accordance with example embodiments of the present disclosure.

Turning to FIG. 7, this figure illustrates an example method of non-invasively installing the temperature sensors, in accordance with example embodiments of the present disclosure. At the onset, it is noted that the temperature sensor 112 in the AC monitoring system of the present disclosure is a resistance temperature detector that operates on the measurement principle that a material's electrical resistance changes with temperature. Typically, the resistance temperature detector is supplied with a constant current and a resulting voltage drop is measured across the resistor to determine the temperature of a material. Even though the present disclosure describes the temperature sensor as being a resistance temperature detector, one of ordinary skill in the art can understand and appreciate that in other example embodiments, any other appropriate temperature sensor can be used instead of or in addition to the resistance temperature detector without departing from a broader scope of the present disclosure. For example, in another example embodiment, the temperature sensor 112 may be an infrared temperature sensor.

As illustrated in FIGS. 3A and 3B, the temperature sensor 112 may include a sensor head 112(*h*) comprising the sensing element and a wire 112(*c*) that extends out from the sensor head 112(*h*) to provide input current/voltage to the sensing element in the sensor head 112(*h*) and to return the output current/voltage from the sensing element in the sensor head 112(*h*). In particular, the sensor head 112(*h*) of the temperature sensor 112 used in the AC monitoring system of the present disclosure may be designed to prevent wear or damage to the metal duct on which they are installed by constant friction contact of the sensor head with the metal ducts resulting from repeated vibration in the high vibration pack system. For example, the sensor heads 112(*h*) may be designed using silicone coated material. Further, the wire 112(*c*) from the sensor head 112(*h*) of the temperature sensor 112 used in the AC monitoring system may be designed such that that it is kept away from the duct carrying very hot air on which the temperature sensor 112 is non-invasively installed. The above-mentioned modifications to the sensor head 112(*h*) and wire 112(*c*) of the temperature sensors 112 allow the AC monitoring system to last longer and avoid the need for frequent replacements or repairs of the AC monitoring system which may be both time and cost intensive. Further, one of ordinary skill in the art can understand and appreciate that the above-mentioned modifications to the sensor head 112(*h*) and wire 112(*c*) of the temperature sensors 112 are examples and are not limiting.

Referring to FIG. 7, in operation 1002, the sensor head 112(*h*) of the temperature sensor 112 may be circumferentially positioned on a flat surface (not on elbows or bends) of a duct 402 on which the temperature sensor 112 is to be non-invasively installed as illustrated in FIG. 3B. Then, in operation 1004, the sensor head 112(*h*) and the duct 402 are wrapped together with at least one layer of high temperature silicone tape 404 (herein 'tape') to hold the sensor head 112(*h*) in contact with the duct 402 as illustrated in FIGS. 3A and 3B. Further, in operation 1006, a fastener such as a band clamp 406 may be installed over the tape 404 to secure the tape 404 and the sensor head 112(*h*) to the duct 402 as illustrated in FIGS. 3A and 3B. The tape 404 also protects the duct 402 from friction contact with the band clamp 406 which could cause damage to the duct 402. In some example embodiments, the installation of the band clamp 406 may be omitted without departing from a broader scope of the present disclosure. Even though the present disclosure describes installing a band clamp 406 over the tape 404, one of ordinary skill in the art can understand and appreciate that in other example embodiments, any other type of fasteners such as hose clamp, adhesive tapes, etc., can be used without departing from a broader scope of the present disclosure.

Responsive to installing the band clamp 406, in operation 1008, the free end of the wire 112(c) that extends out from the sensor head 112(h) may be coupled to one end of a splice, e.g., a jiffy splice. Coupling the wire 112(c) from the sensor head 112(h) to the splice allows easy replacement of the temperature sensor 112, if needed. After coupling the free end of the wire 112(c) to one end of the splice, in operations 1010 and 1012, new sensor wiring may be coupled to an opposite end of the splice and routed to the data concentrator unit 106 by following existing wiring bundles. Then, in operation 1014, the new sensor wiring may be coupled to the data concentrator unit 106 that collects voltage data from the temperature sensor 112, determines a voltage drop resulting from a resistance change based on the temperature of the air carried through the duct 402, and calculates the temperature of the air that carried through the duct 402 based on the voltage drop.

Returning to FIG. 6, once the temperature sensors 112 are non-invasively installed, in operation 906, a pressure sensor 116 may be non-invasively coupled to the trim air duct to measure a pressure of the trim air. Operation 906 will be described below in greater detail in association FIG. 8 by making example reference to FIGS. 4A and 4B, as necessary.

Figure 8:
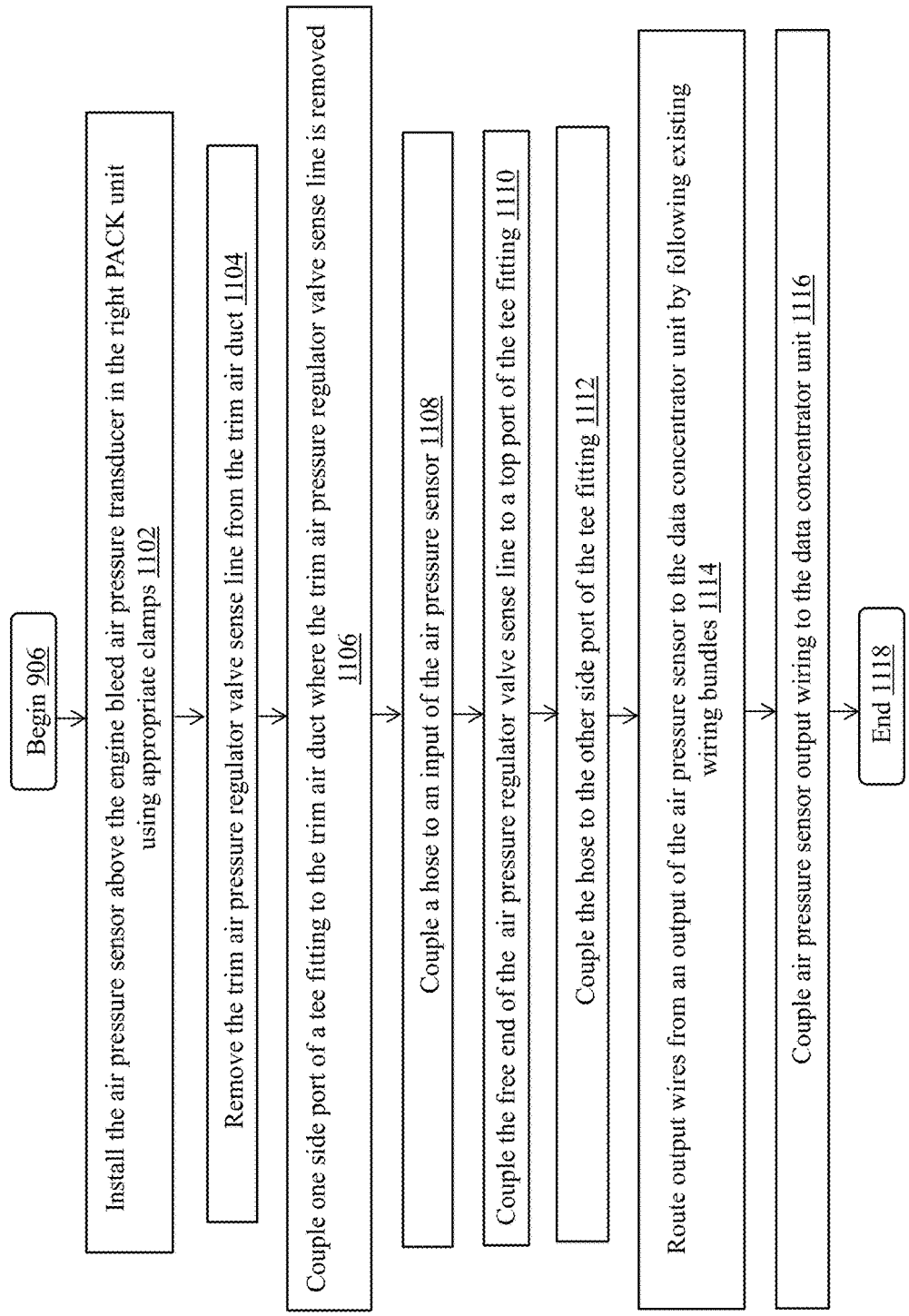
FIG. 8 illustrates an example method of non-invasively installing the air pressure sensors, in accordance with example embodiments of the present disclosure.

Turning to FIG. 8, this figure illustrates an example method of non-invasively installing the air pressure sensors, in accordance with example embodiments of the present disclosure. At the onset, it is noted that the trim air duct 550 has a pre-existing aperture/opening to which a trim air pressure sense line 502 is coupled for transferring a portion of the trim air to a trim air pressure regulating valve 206. The AC monitoring system makes use of the pre-existing opening in the trim air duct 550 to non-invasively install the air pressure sensor 116.

Figure 4A:
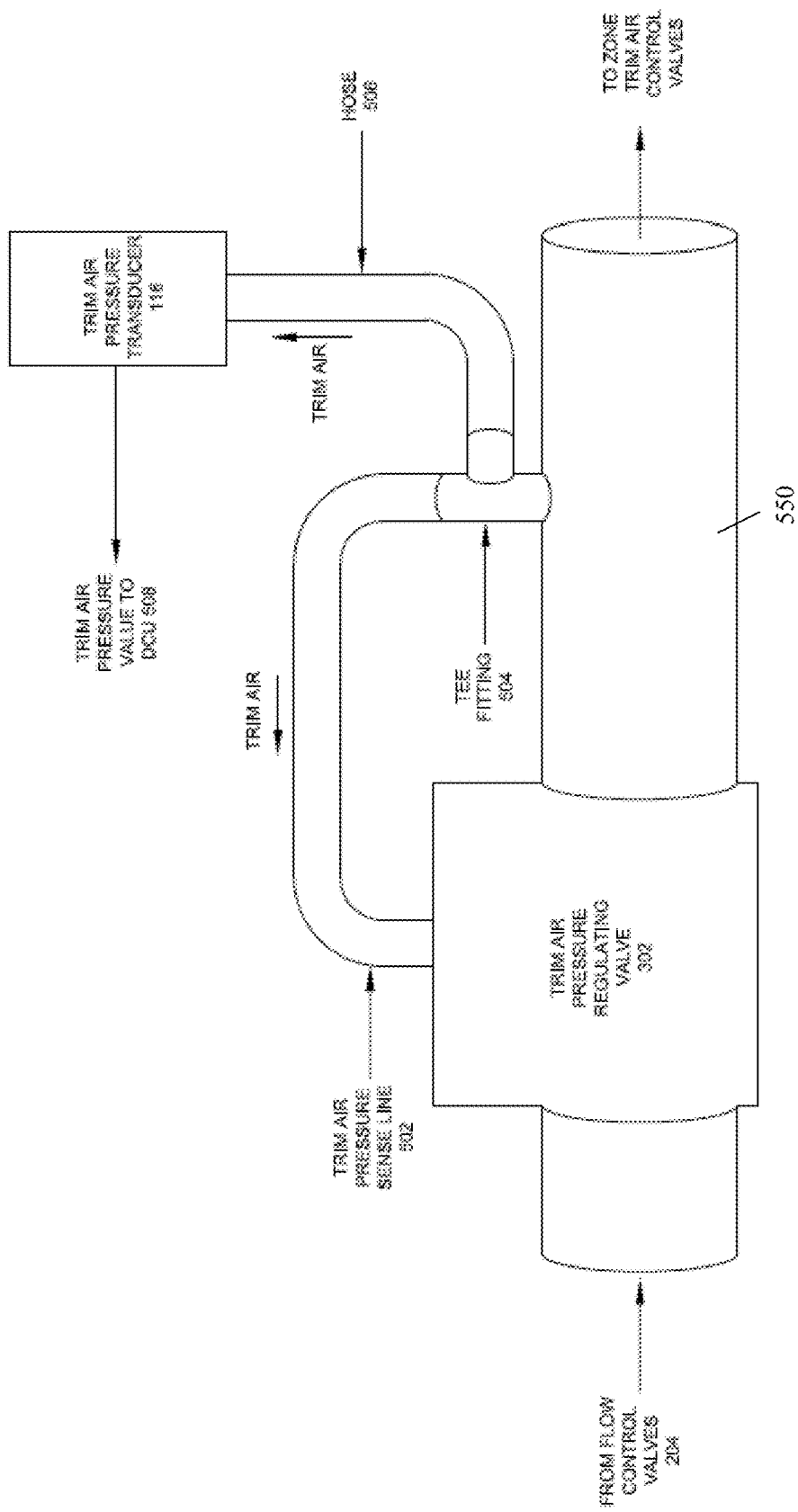
FIG. 4A illustrates a schematic diagram of how an example air pressure sensor is non-invasively coupled to the trim air duct via a tee fitting, in accordance with example embodiments of the present disclosure.
Figure 4B:
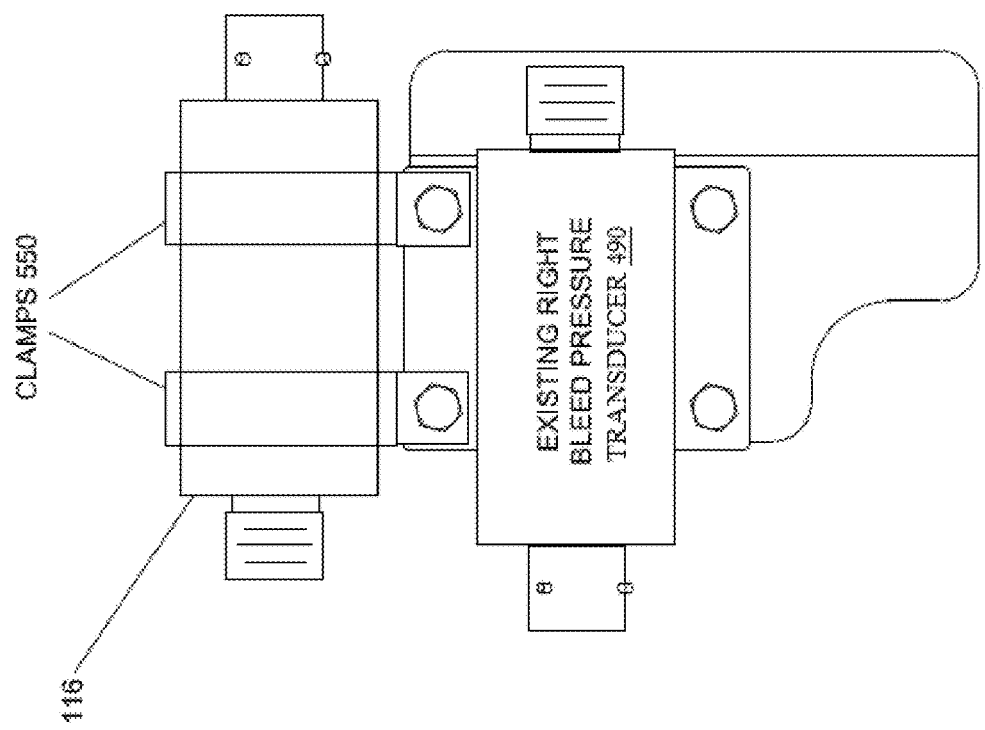
FIG. 4B illustrates the example air pressure sensor installed in a pack system of the aircraft using clamps, in accordance with example embodiments of the present disclosure.

In operation 1102, the air pressure sensor 116 may be installed on top of the right engine bleed air pressure transducer 490 that already exists the right pack 118. In particular, as illustrated in FIG. 4B, the air pressure sensor 116 may be installed on top of the right engine bleed pressure transducer 490 using clamps 550. However, in other example embodiments, the air pressure sensor 116 may be installed at any other appropriate location in the right pack 118 without departing from a broader scope of the present disclosure.

Responsive to installing the air pressure sensor 116 above the right engine bleed air pressure transducer 490, in operation 1104, trim air pressure sense line 502 is removed from the trim air duct 550. Then, as illustrated in FIG. 4A, in operation 1106, a side port of the tee fitting 504 is coupled to the pre-existing opening of the trim air duct 550 to which the trim air pressure sense line 502 was previously coupled. Further, in operation 1108, one end of a hose 506, e.g., a high temperature braided hose, may be coupled to an input of the air pressure sensor 116 that is installed on top of the right engine bleed air pressure transducer 490 as illustrated in FIG. 4B. Furthermore, as illustrated in FIG. 4A, in operation 1110 and 1112, the free end of the trim air pressure sense line 502 that was previously coupled to the trim air duct 550 may be coupled to a top port of the tee fitting 504, and the opposite end of the hose 506 may be coupled to the opposite side port of the tee fitting 504 (i.e., the side port that is not coupled to the opening of the trim air duct 550).

Once the air pressure sensor 116 is non-invasively coupled to the trim air duct 550 using the tee fitting 504 as illustrated in FIG. 4A, in operations 1114 and 1116, wires/cables may be coupled to the output of the air pressure sensor 116 and routed to the data concentrator unit 106 by following existing wiring bundles. Further, the output wires from the air pressure sensor 116 may be coupled to the data concentrator unit 106 that collects the output data from the air pressure sensor 116 and process the output data to determine an air pressure of the trim air passing through the trim air duct 550.

Returning to FIG. 6, once the temperature sensors 112 and the pressure sensor 116 are non-invasively installed, in operation 908, the flow control valve 204 and the temperature control valve 302 of both the right and left packs (110, 118) may be configured to provide valve position data to the data concentrator unit 106. Operation 908 will be described below in greater detail in association FIG. 9.

Figure 9:
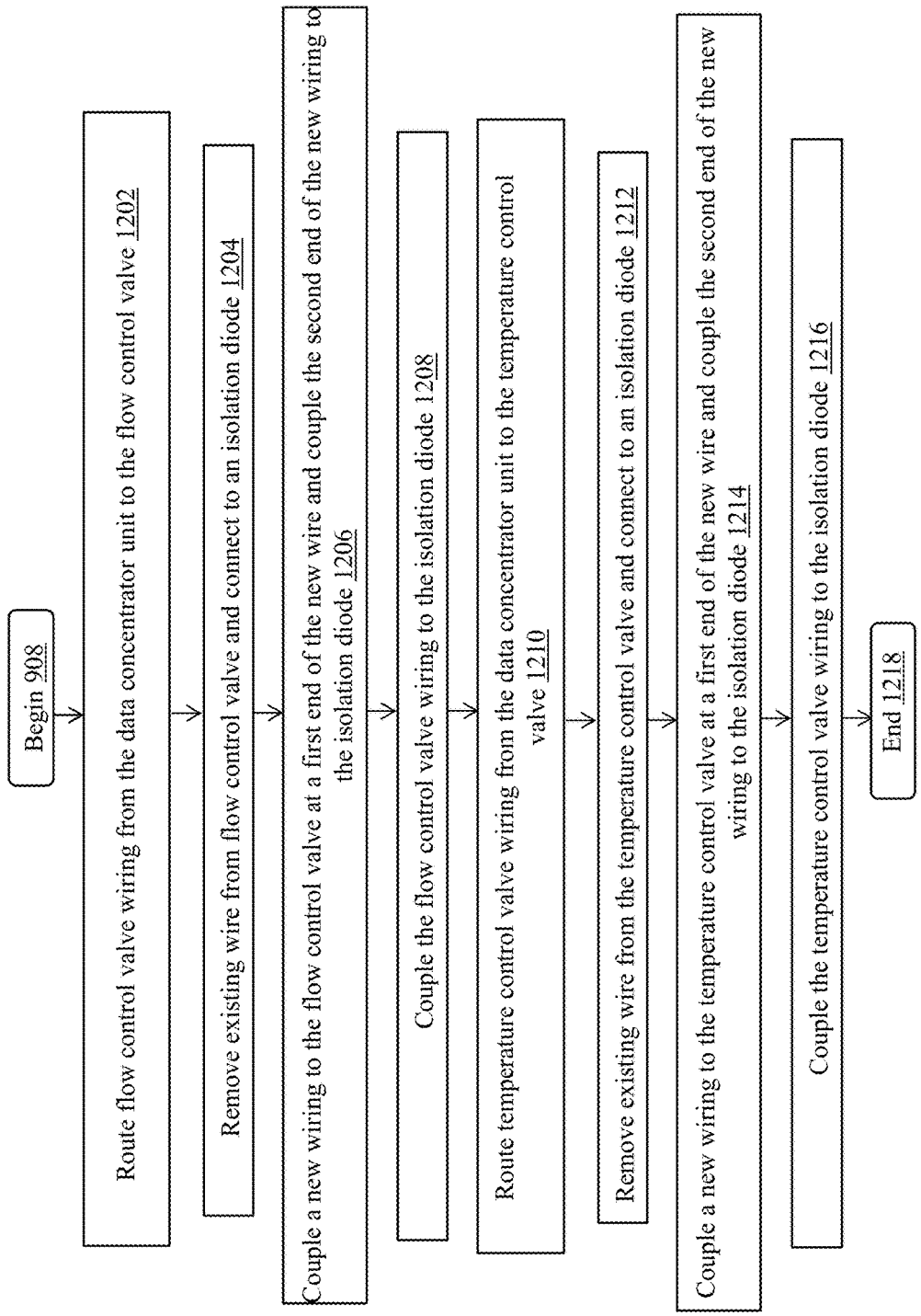
FIG. 9 illustrates an example method of non-invasively monitoring valve positions, in accordance with example embodiments of the present disclosure.

Turning to FIG. 9, this figure illustrates an example method of non-invasively monitoring valve positions, in accordance with example embodiments of the present disclosure. At the onset it is noted that each valve, i.e., the flow control valve 204 and the temperature control valve 302, has a switch that provides data regarding the position of the valve to different systems of the aircraft 102 for control purposes, e.g., pressurization system, flight planning system, nitrogen inerting system, etc.

In the case of the flow control valve 204, additional wiring modifications have to be made as described below to tap into the valve position data for the predictive monitoring of the AC monitoring system without affecting the current extraction of valve position data for control operations of the above-mentioned systems of the aircraft 102. In the case of the temperature control valve 302, the switch of the temperature control valve 302 may have additional contacts that can be used to tap into the valve position data for the predictive monitoring of the AC monitoring system without affecting the current extraction of valve position data for control operations of the above-mentioned systems of the aircraft 102. Alternatively, valve position data of the temperature control valve 302 may be obtained similar to the valve position data of the flow control valve as described above, i.e., by making wiring modifications to retrieve data without affecting the current extraction of data for control operations of the aircraft 102. For example, valve position data of the temperature control valve 302 may be obtained by tapping into existing used contacts using diodes as will be described in greater detail below in association with FIG. 9. In other example embodiments, where the aircrafts have Aircraft Condition Monitoring System (ACMS) configurations, the valve position data of the flow control valve 204 and/or the temperature control valve 302 may be sourced from existing ACMS inputs.

In operation 1202, flow control valve wiring may be routed from the data concentrator unit 106 to the valve switch of the flow control valve 204 from which valve position data of the flow control valve 204 is to be collected. The flow control valve wiring may be routed by following existing wiring bundles. Then, in operation 1204, an existing output wire that is connected to valve switch of the flow control valve 204 may be removed from the valve switch and coupled to an isolation diode that is used for electrical isolation of the data concentrator unit 106 and the data concentrator unit wiring from the aircraft circuits. Said electrical isolation prevents a data concentrator unit 106 failure from affecting the operation of the air conditioning system. Responsively, in operation 1206, a new wire may be coupled to the valve switch at a first end and to the isolation diode at the second end. Further, in operation 1208, the flow control valve wiring from the data concentrator unit 106 may also be coupled to isolation diode such that the components of the aircraft air-conditioning system and/or other systems will be electrically isolated from the data concentrator unit 106 in the event of a failure of the data concentrator unit 106.

In the case of the temperature control valve 302, a temperature control valve wiring may be routed from the data concentrator unit 106 towards the temperature control valve 302 and coupled to the switch of the temperature control valve 302. It is noted that appropriate electrical grounding connections are also made as needed. Alternatively, in the case of the temperature control valve 302, in operation 1210, temperature control valve wiring may be routed from the data concentrator unit 106 to the valve switch of the temperature control valve 302 from which valve position data of the temperature control valve 302 is to be collected. The temperature control valve wiring may be routed by following existing wiring bundles. Then, in operation 1212, an existing output wire that is connected to valve switch of the temperature control valve 302 may be removed from the valve switch and coupled to an isolation diode that is used for electrical isolation of the data concentrator unit 106 and the data concentrator unit wiring from the aircraft circuits. Said electrical isolation prevents a data concentrator unit 106 failure from affecting the operation of the air conditioning system. Responsively, in operation 1214, a new wire may be coupled to the valve switch at a first end and to the isolation diode at the second end. Further, in operation 1216, the temperature control valve wiring from the data concentrator unit 106 may also be coupled to isolation diode such that the components of the aircraft air-conditioning system and/or other systems will be electrically isolated from the data concentrator unit 106 in the event of a failure of the data concentrator unit 106.

It is noted that in aircrafts equipped with an ACMS configurations, the flow control valve 204 and/or the temperature control valve 302 may be sourced from existing ACMS inputs.

Returning to FIG. 6, once the temperature sensors 112, the pressure sensor 116, and the valve switch wiring are non-invasively installed, in operation 910, the data concentrator unit 106 may be installed in an appropriate location of the air conditioning distribution bay of the aircraft 102. However, in some example embodiments, the data concentrator unit 106 may be non-invasively mounted prior to installing the sensors (112, 116) and the valve switch wiring 114.

Figure 5B:
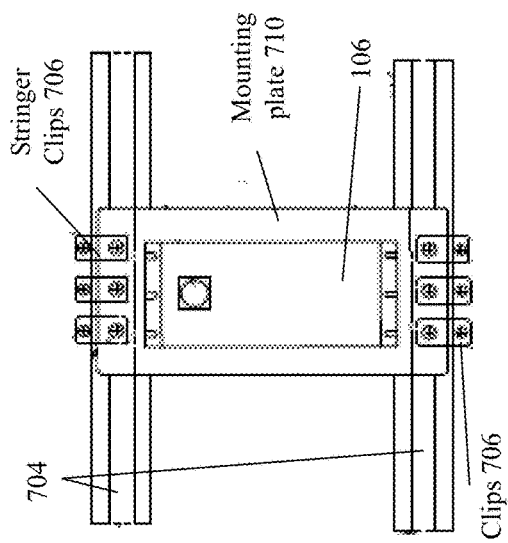
FIGS. 5A, 5B, and 5C (collectively 'FIG. 5') illustrates an example mounting mechanism of the data concentrator unit of the non-invasive and predictive aircraft pack monitoring system, in accordance with example embodiments of the present disclosure.
Figure 5C:
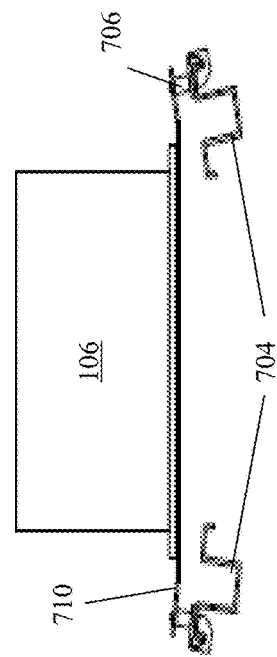
Figure 5A:
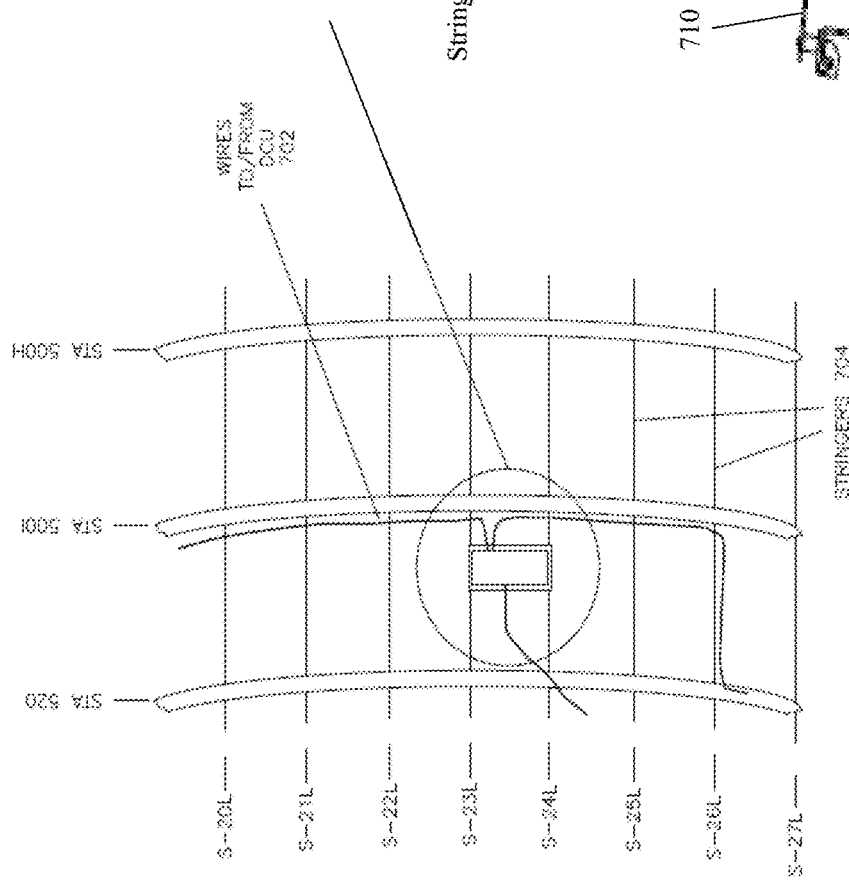

The non-invasive mounting of the data concentrator unit 106 may be described by making example reference to FIGS. 5A-5C, as needed. FIGS. 5A-5C (collectively 'FIG. 5') illustrates an example non-invasive mounting mechanism of the data concentrator unit, in accordance with example embodiments of the present disclosure. As illustrated in FIG. 5, the data concentrator unit 106 may be installed using a mounting plate assembly 710 that is coupled to the airframe, e.g., stringers 704, of the aircraft 102 using stringer clips 706.

To non-invasively install the data concentrator unit 106, initially, the non-invasive stringer clips 706 may be clamped to the stringers 704 and fasteners integral to the stringer clips 706 may be used to tighten the clamping of the stringer clips 706 to the stringers 704. In particular, the stringer clips 706 may be clamped to the stringers 704 such that they align with the location of the mounting plate assembly 710. Further, the mounting plate assembly 710 may be coupled to the stringers clips 706 using fasteners. Then, the data concentrator unit 106 may be mounted on the central portion of the mounting plate assembly 710 using any appropriate mounting mechanism that securely attaches the data concentrator unit 106 to the mounting plate assembly 710. Even though FIG. 5B illustrates that the data concentrator unit is disposed on the mounting plate assembly 710 such that a front face of the data concentrator unit, i.e., the face with the power receptacle, faces outward and away from the mounting plate assembly 710, one of ordinary skill in the art can understand and appreciate that in other example embodiments, the shape of the mounting plate assembly 710 (bracket) may be different and data concentrator unit may be disposed in any other appropriate position that provides easy access to wiring, easy installation, and clearance from surroundings without departing from a broader scope of the present disclosure. For example, the data concentrator unit may be rotated 90 degrees along its vertical axis (passing along the length) before mounting on the mounting plate assembly 710.

Responsive to installing the data concentrator unit 106, in operation 912, the new sensor wiring, the pressure sensor output wiring, and the valve switch wiring may be coupled to the data concentrator unit 106. In one example, the sensor wiring and the valve switch wiring may be terminated using one or more multi-pin connectors that are configured to mate with respective multi-pin connector receptacles in the data concentrator unit 106. However, in other example embodiments, any other appropriate mechanism may be used to terminate the sensor and valve switch output wiring at the data concentrator unit 106.

As described above in association with FIG. 1, the data concentrator unit 106 may be configured to receive the sensor output data and the valve position data, calculate temperature and pressure values from the received sensor output data, and generate a single output data stream, such as ARINC 429 words. In one example embodiment, the sensor output data and the valve position data may be sampled every second and transmitted to the data concentrator unit 106. However, in other example embodiments, the sensor and valve position data may be sample and transmitted at a slower or faster rate without departing from a broader scope of the present disclosure. Further, even though the present disclosure describes that the data concentrator unit 106 converts the received sensor and valve position data to ARINC 429 word, one of ordinary skill in the art can understand and appreciate that in other example embodiments, the data concentrator unit 106 may convert the received input data into an output data of any other appropriate format that is understandable and compatible with the configurable data receiver unit 124, such as a configurable ARINC 429 receiver, of the aircraft 102.

By converting multiple input data to a single output data stream, the data concentrator unit 106 provides a solution to the limited availability of sensor input ports in the configurable data receiver unit 124 of the aircraft 102. In other words, the data concentrator unit 106 allows the AC monitoring system to have more number of sensors or discrete inputs (e.g., valve switch inputs) than the number of sensor input ports available in the configurable data receiver unit 124. The data concentrator unit 106 may be flexible to receive input from more or lesser number of sensors or valve switches. The configurability of the data concentrator unit 106 provides flexibility to have additional number of sensors or switches to monitor other aircraft systems in the future if needed.

Once the data concentrator unit 106 is installed and the sensor and valve switch wiring are coupled to the data concentrator unit 106, in operation 914, the output of the data concentrator unit 106 may be coupled to an input port, e.g., the ARINC 429 input port of the aircraft's configurable data receiver unit 124, such as an ARINC 429 receiver. Even though the present disclosure describes the configurable data receiver unit 124 as being coupled to the data concentrator unit 106 using wires, one of ordinary skill in the art can understand and appreciate that in other example embodiments, the data concentrator unit 106 may be wirelessly coupled to any other appropriate data receiver that is configured to receive and transmit the wireless output data from the data concentrator unit that is in an appropriate wireless data format. Accordingly, in said example embodiment, both the data concentrator unit 106 and the configurable data receiver unit 124 may be provisioned for wireless transmission and reception of data.

Figure 10:
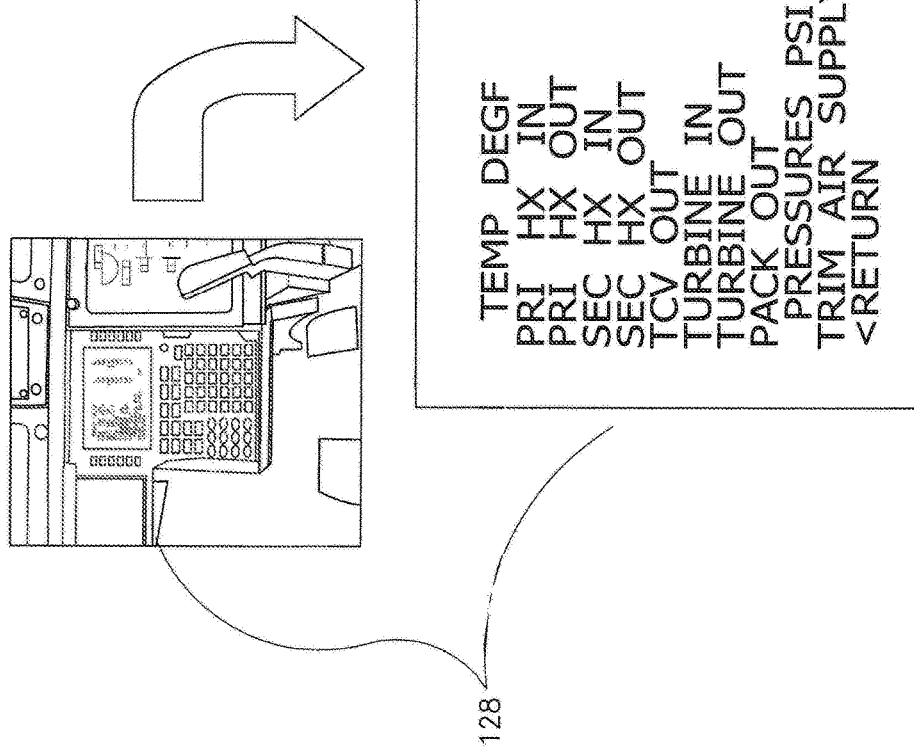
FIG. 10 illustrates an example on-board display of the sensor and valve position outputs, in accordance with example embodiments of the present disclosure.

In either case, responsive to coupling the output of the data concentrator unit 106 to the input of the configurable data receiver unit 124, in operation 916, the configurable data receiver unit 124 may be configured to transmit the output data stream from the data concentrator unit 106 to an on-board display 128, such as a central display unit for quick and real-time viewing of the air-conditioning system performance. An example on-board display 128 that presents the sensor and valve position data is illustrated in FIG. 10. In addition to transmitting the received sensor data and the valve position data to the on-board display 128, in operation 916, the configurable data receiver unit 124 may be configured to transmit the received data to a datalink system 126, such as ACARS, which in turn is configured to transmit the received sensor data and valve position data to a ground server 132 via a satellites or airband radios 130. In one example embodiment, the configurable data receiver unit 124 may be configured to transmit the received data to a datalink system 126 at periodic intervals. In another example embodiment, the configurable data receiver unit 124 may be configured to transmit the received data to a datalink system 126 at specific times, such as during taxing, take off, climb, cruise, descend, landing, etc. In yet another example embodiment, the configurable data receiver unit 124 may be configured to transmit the received data to a datalink system 126 based on specific triggers. For example, the configurable data receiver unit 124 may transmit the received sensor data and valve position data to the ground server 132 via the data link system 126 when a discrepancy in any of the pack components is determined based on the received sensor data and valve position data.

In either case, responsive to receiving the sensor data and the valve position data from the aircraft 102, the ground server 132 may be configured to process and analyze the received data using any appropriate analytical tool, e.g., analytic and diagnostic tool 1402, to determine the performance of the packs (110, 118) and/or trends related to the performance of each pack component as illustrated in FIG. 11. Further, the performance data and trends of the pack components may be used by the aircraft operator or maintenance crew as a diagnostic tool to troubleshoot a discrepant pack (110 and/or 118). Furthermore, the ground server 132 may be configured to generate reports associated with the performance of the packs (110, 118).

Even though the present disclosure describes sensor output data and the valve position data are transmitted through wires from the sensors and the valve interfaces to the data concentrator unit 106, one of ordinary skill in the art can understand that the AC monitoring system may include wireless sensors that can be used to wirelessly communicate with the data concentrator unit 106.

The AC monitoring system of the present disclosure may significantly reduce maintenance time and cost. Further, the AC monitoring system allows predictive monitoring of the AC packs thereby improving the chances of preventing a breakdown or failure of the AC packs, which in turn results in significant cost savings as well as reduces flight delays or cancellations. Furthermore, the AC monitoring system provides flexibility for adding more sensors to monitor the air-conditioning system and/or other systems of the aircraft despite the sensor input port limitation of the aircraft's flight data acquisition unit. Additionally, the AC monitoring system provides a relatively inexpensive monitoring solution that preserves the structural integrity of the aircraft by non-invasive installation. Also, the non-invasive installation increases the flexibility of the AC monitoring system to retrofit any appropriate AC system of both older and newer aircraft models.

The AC monitoring system as disclosed herein may be embodied in many different forms and should not be construed as limited to the embodiments set forth herein; rather, these embodiments are provided so that this disclosure will be thorough and complete, and will fully convey the scope of the disclosure to those having ordinary skill in the art. Furthermore, all "examples" or "exemplary embodiments" given herein are intended to be non-limiting and among others supported by representations of the present disclosure.

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

What is claimed is:
1. A system comprising:
   a plurality of temperature sensors, each non-invasively installed in at least one air-conditioning pack of an aircraft and operative to generate temperature sensor data in response to monitoring a temperature of air passing through the at least one air-conditioning pack, wherein each temperature sensor of the plurality of temperature sensors includes a sensor head comprising a sensing element and a wire extending out from the sensor head for sending inputs to and receiving output from the sensing element of the sensor head, and
   wherein a high temperature silicone tape is disposed over the sensor head of each temperature sensor and a respective duct on which the sensor head is disposed to hold the sensor head in contact with the respective duct and to protect the respective duct from a band clamp disposed over the high temperature silicone tape;
   a plurality of valve interfaces, each non-invasively and electrically coupled to one or more valves of the at least one air-conditioning pack and operative to generate valve position data in response to monitoring a position of the one or more valves;

a pressure sensor that is non-invasively installed in the at least one air-conditioning pack and operative to generate pressure sensor data in response to monitoring an air pressure of a duct of the at least one air-conditioning pack;

a data concentrator unit non-invasively mounted in the aircraft and coupled to the plurality of temperature sensors, the plurality of valve interfaces, and the pressure sensor, wherein the data concentrator unit is operative to generate a single output data stream in response to receiving the temperature sensor data, the pressure sensor data and the valve position data; and a configurable data receiver unit coupled to the output of the data concentrator unit and operative to transmit the output data stream to an on-board display in response to receiving the output data stream.

2. The system of claim 1, wherein the plurality of temperature sensors are resistance temperature detectors.

3. The system of claim 1, wherein the air pressure sensor is configured to monitor the pressure of trim air passing through a trim air duct.

4. The system of claim 1, wherein each temperature sensor is non-invasively installed on an exterior surface of the respective duct of the at least one air-conditioning pack using the band clamp.

5. The system of claim 1, wherein one of the plurality of temperature sensors is installed on a duct carrying a pack discharge air that is output from the at least one air-conditioning pack.

6. The system of claim 1, wherein the plurality of valve interfaces include a flow control valve interface that is coupled to a flow control valve of the at least one air-conditioning pack and is configured to monitor a position of the flow control valve.

7. The system of claim 1, wherein the plurality of valve interfaces include a temperature control valve interface that is coupled to a temperature control valve of the at least one air-conditioning pack and is configured to monitor a position of the temperature control valve.

8. The system of claim 1, wherein the configurable data receiver unit is configured to transmit the output data stream to a ground server via a datalink system of the aircraft.

9. A system comprising:
a plurality of temperature sensors, each non-invasively installed in at least one air-conditioning pack of an aircraft and operative to generate temperature sensor data in response to monitoring a temperature of air passing through the at least one air-conditioning pack, wherein the plurality of temperature sensors are installed on ducts at an input and an output of a primary heat exchanger, a secondary heat exchanger, and a turbine of the at least one air-conditioning pack;

a plurality of valve interfaces, each non-invasively and electrically coupled to one or more valves of the at least one air-conditioning pack and operative to generate valve position data in response to monitoring a position of the one or more valves;

a pressure sensor that is non-invasively installed in the at least one air-conditioning pack and operative to generate pressure sensor data in response to monitoring an air pressure of a duct of the at least one air-conditioning pack;

a data concentrator unit non-invasively mounted in the aircraft and coupled to the plurality of temperature sensors, the plurality of valve interfaces, and the pressure sensor, wherein the data concentrator unit is operative to generate a single output data stream in response to receiving the temperature sensor data, the pressure sensor data and the valve position data; and a configurable data receiver unit coupled to the output of the data concentrator unit and operative to transmit the output data stream to an on-board display in response to receiving the output data stream.

10. The system of claim 9, wherein the plurality of temperature sensors comprise resistance temperature detectors.

11. The system of claim 9, wherein the air pressure sensor monitors the pressure of trim air passing through a trim air duct.

12. A system comprising:
a plurality of temperature sensors, each non-invasively installed in at least one air-conditioning pack of an aircraft and operative to generate temperature sensor data in response to monitoring a temperature of air passing through the at least one air-conditioning pack, wherein one of the plurality of temperature sensors is installed on a duct at the output of a temperature control valve of the at least one air-conditioning pack;

a plurality of valve interfaces, each non-invasively and electrically coupled to one or more valves of the at least one air-conditioning pack and operative to generate valve position data in response to monitoring a position of the one or more valves;

a pressure sensor that is non-invasively installed in the at least one air-conditioning pack and operative to generate pressure sensor data in response to monitoring an air pressure of a duct of the at least one air-conditioning pack;

a data concentrator unit non-invasively mounted in the aircraft and coupled to the plurality of temperature sensors, the plurality of valve interfaces, and the pressure sensor, wherein the data concentrator unit is operative to generate a single output data stream in response to receiving the temperature sensor data, the pressure sensor data and the valve position data; and a configurable data receiver unit coupled to the output of the data concentrator unit and operative to transmit the output data stream to an on-board display in response to receiving the output data stream.

13. The system of claim 12, wherein the configurable data receiver unit transmits the output data stream to a ground server via a datalink system of the aircraft.

14. The system of claim 12, wherein the air pressure sensor is installed on a trim air duct of the at least one air-conditioning pack using a tee fitting.

15. A system comprising:
a plurality of temperature sensors, each non-invasively installed in at least one air-conditioning pack of an aircraft and operative to generate temperature sensor data in response to monitoring a temperature of air passing through the at least one air-conditioning pack;

a plurality of valve interfaces, each non-invasively and electrically coupled to one or more valves of the at least one air-conditioning pack and operative to generate valve position data in response to monitoring a position of the one or more valves;

a pressure sensor that is non-invasively installed in the at least one air-conditioning pack and operative to generate pressure sensor data in response to monitoring an air pressure of a duct of the at least one air-conditioning pack, wherein the pressure sensor is non-invasively installed on a trim air duct of the at least one air-conditioning pack using a tee fitting;

a data concentrator unit non-invasively mounted in the aircraft and coupled to the plurality of temperature sensors, the plurality of valve interfaces, and the pressure sensor, wherein the data concentrator unit is operative to generate a single output data stream in response to receiving the temperature sensor data, the pressure sensor data and the valve position data; and a configurable data receiver unit coupled to the output of the data concentrator unit and operative to transmit the output data stream to an on-board display in response to receiving the output data stream.

16. The system of claim 15, wherein the plurality of temperature sensors comprise resistance temperature detectors.

17. The system of claim 15, wherein the configurable data receiver unit transmits the output data stream to a ground server via a datalink system in response to receiving the output data stream.

18. The system of claim 17, wherein the ground server is configured to predict a fault of at least one component of at least one of the air-conditioning packs prior to the occurrence of the fault based on the output data stream that is received from the configurable data receiver.

19. A system comprising:

a plurality of temperature sensors, each non-invasively installed in at least one air-conditioning pack of an aircraft and operative to generate temperature sensor data in response to monitoring a temperature of air passing through a respective duct of the at least one air-conditioning pack on which the temperature sensor is installed, wherein each temperature sensor of the plurality of temperature sensors includes a sensor head comprising a sensing element and a wire extending out from the sensor head for sending inputs to and receiving output from the sensing element of the sensor head, wherein each temperature sensor is non-invasively installed on an exterior surface of a respective duct of the at least one air-conditioning pack using a band clamp, and wherein a high temperature silicone tape is disposed over the sensor head of each temperature sensor and the respective duct to hold the sensor head in contact with the respective duct and to protect the respective duct from the band clamp, and wherein the band clamp is disposed over the high temperature silicone tape;

a plurality of valve interfaces, each non-invasively and electrically coupled to one or more valves of the at least one air-conditioning pack and operative to generate valve position data in response to monitoring a position of a respective valve of the one or more valves to which the valve interface is coupled;

a pressure sensor that is non-invasively installed in the at least one air-conditioning pack and operative to generate pressure sensor data in response to monitoring air pressure in a duct of the at least one air-conditioning pack;

a data concentrator unit that is non-invasively installed in the aircraft and coupled to the plurality of temperature sensors, the plurality of valve interfaces, and the pressure sensor, wherein the data concentrator unit is operative to generate a single output data stream in response to receiving the temperature sensor data, the pressure sensor data, and the valve position data for transmission to a ground server and an on-board display.

20. The system of claim 19, wherein the single output data stream is transmitted to a ground server and an on-board display via a configurable data receiver unit that is coupled to the data concentrator unit.

21. The system of claim 20, wherein the data concentrator unit is wirelessly coupled to the configurable data receiver unit.

22. The system of claim 19, wherein the single output data stream is Aeronautical Radio, Incorporated 429 (ARINC 429) words.

23. The system of claim 19, wherein the plurality of temperature sensors are resistance temperature detectors.

24. The system of claim 19, wherein the pressure sensor is non-invasively installed on a trim air duct of the at least one air-conditioning pack using a tee fitting.

25. A system comprising:

a plurality of temperature sensors, each non-invasively installed in at least one air-conditioning pack of an aircraft and operative to generate temperature sensor data in response to monitoring a temperature of air passing through a respective duct of the at least one air-conditioning pack on which the temperature sensor is installed;

a plurality of valve interfaces, each non-invasively and electrically coupled to one or more valves of the at least one air-conditioning pack and operative to generate valve position data in response to monitoring a position of a respective valve of the one or more valves to which the valve interface is coupled;

a pressure sensor that is non-invasively installed in the at least one air-conditioning pack and operative to generate pressure sensor data in response to monitoring air pressure in a duct of the at least one air-conditioning pack;

a data concentrator unit that is non-invasively installed in the aircraft and coupled to the plurality of temperature sensors, the plurality of valve interfaces, and the pressure sensor, wherein the data concentrator unit is operative to generate a single output data stream in response to receiving the temperature sensor data, the pressure sensor data, and the valve position data for transmission to a ground server and an on-board display, and wherein the non-invasive installation of the data concentrator unit comprises mounting the data concentrator unit on a mounting plate assembly that is clamped to stringers of the aircraft using a plurality of stringer clips.

26. The system of claim 25, wherein a configurable data receiver unit, coupled to the data concentrator unit, transmits the single output data stream to a ground server and the on-board display that is.

27. The system of claim 25, wherein the plurality of temperature sensors comprise resistance temperature detectors, and wherein the pressure sensor is non-invasively installed on a trim air duct of the at least one air-conditioning pack using a tee fitting.

* * * * *